(12) United States Patent
Holt

(10) Patent No.: US 8,422,826 B2
(45) Date of Patent: Apr. 16, 2013

(54) METHOD AND APPARATUS TO FACILITATE USING FUSED IMAGES TO IDENTIFY MATERIALS

(75) Inventor: Kevin M. Holt, Chicago, IL (US)

(73) Assignee: Varian Medical Systems, Inc., Palo Alto, CA (US)

( * ) Notice: Subject to any disclaimer, the term of this patent is extended or adjusted under 35 U.S.C. 154(b) by 923 days.

(21) Appl. No.: 12/479,322

(22) Filed: Jun. 5, 2009

(65) Prior Publication Data

US 2010/0310175 A1    Dec. 9, 2010

(51) Int. Cl.
*G06K 9/32* (2006.01)
*G06K 9/46* (2006.01)
*G09G 5/00* (2006.01)

(52) U.S. Cl.
USPC .......................... 382/294; 382/195; 345/634

(58) Field of Classification Search .................. 382/132, 382/195, 294; 378/53, 57; 250/306, 307; 345/634
See application file for complete search history.

(56) References Cited

U.S. PATENT DOCUMENTS

| | | | |
|---|---|---|---|
| 4,511,799 A | 4/1985 | Bjorkholm | |
| 5,319,547 A | 6/1994 | Krug et al. | |
| 5,481,584 A | 1/1996 | Tang et al. | |
| 5,524,133 A | 6/1996 | Neale et al. | |
| 5,548,123 A | 8/1996 | Perez-Mendez et al. | |
| 5,917,880 A | 6/1999 | Bjorkholm | |
| 6,069,936 A | 5/2000 | Bjorkholm | |
| 6,597,759 B2 * | 7/2003 | Mazess et al. ................. | 378/53 |
| 7,257,188 B2 * | 8/2007 | Bjorkholm ...................... | 378/53 |
| 7,636,417 B2 | 12/2009 | Bjorkholm | |
| 7,945,017 B2 * | 5/2011 | Chen et al. ...................... | 378/57 |
| 2007/0183568 A1 | 8/2007 | Kang et al. | |
| 2009/0129544 A1 | 5/2009 | Chen et al. | |

OTHER PUBLICATIONS

Maitrejean et al., "Multi-Energy Method: A New Approach for Measuring X-Ray Transmission as Function of Energy with a Bremsstrahlung Source. Application for Heavy Element Identification," Proceedings for the International Society for Optical Engineering; vol. 3446; pp. 114-133; Jul. 22, 1998.
Rebuffel et al., "Dual-Energy X-Ray Imaging: Benefits and Limits," Insight (Non-Destructive Testing and Condition Monitoring, British Institute of Non-Destructive Testing; vol. 40, Issue 10; pp. 589-594; Oct. 1, 2007.
Extended European Search Report for related EP Application No. 10164828.5; 7 pages; Oct. 4, 2010.
EP Search Report from related application No. EP10164833.5; Oct. 19, 2010; 5 pages.
Ogorodnikov et al., "Processing of Interlaced Images in 4-10 MeV Dual Energy Customs System for Material Recognition," Physical Review Special Topics—Accelerators and Beams, vol. 5, 104701 (2002); 11 pages.

* cited by examiner

*Primary Examiner* — Yon Couso
(74) *Attorney, Agent, or Firm* — Fitch, Even, Tabin & Flannery LLP

(57) ABSTRACT

First image data (which comprises a penetrating image of an object formed using a first spectrum) and second image data (which also comprises a penetrating image of this same object formed using a second, different spectrum) is retrieved from memory and fused to facilitate identifying at least one material that comprises at least a part of this object. The aforementioned first spectrum can comprise, for example, a spectrum of x-ray energies having a high typical energy while the second spectrum can comprise a spectrum of x-ray energies with a relatively lower typical energy. By one approach, this process can associate materials as comprise the object with corresponding atomic numbers and hence corresponding elements (such as, for example, uranium, plutonium, and so forth).

50 Claims, 1 Drawing Sheet

101 — RETRIEVE FROM MEMORY AT LEAST FIRST IMAGE DATA AND SECOND IMAGE DATA (WHEREIN THE FIRST IMAGE DATA COMPRISES A PENETRATING IMAGE OF AT LEAST PART OF AT LEAST ONE OBJECT FORMED USING A FIRST SPECTRUM AND THE SECOND IMAGE DATA COMPRISES A PENETRATING IMAGE OF AT LEAST A PART OF THE OBJECT FORMED USING A SECOND SPECTRUM THAT IS DIFFERENT THAN THE FIRST SPECTRUM)

102 — FUSE THE AT LEAST FIRST AND SECOND IMAGE DATA TO IDENTIFY AT LEAST ONE MATERIAL AS COMPRISES AT LEAST A PART OF THE OBJECT

*100*

METHOD AND APPARATUS TO FACILITATE USING FUSED IMAGES TO IDENTIFY MATERIALS

RELATED APPLICATIONS

This application relates generally to a commonly-owned co-pending application entitled METHOD AND APPARATUS TO FACILITATE USING MULTIPLE RADIATION-DETECTION VIEWS TO DIFFERENTIATE ONE MATERIAL FROM ANOTHER having application Ser. No. 12/479,376 as filed on even date herewith, the contents of which are fully incorporated herein by this reference.

TECHNICAL FIELD

This invention relates generally to the processing and interpretation of penetrating image data.

BACKGROUND

The capture of images of a given object using penetrating energy (such as X-rays or the like) is well known in the art. Such images often comprise areas that are relatively darker or lighter (or which otherwise contrast with respect to one another) as a function of the density, path length, and composition of the constituent materials that comprise the object being imaged. This, in turn, can serve to provide views of objects that are otherwise occluded from visual inspection.

The use of penetrating images finds myriad applications. In at least some application settings, however, merely ascertaining the shape of an occluded object may be insufficient to address all attendant needs. In a security application setting, for example, objects that pose a serious security concern may share a same shape with other completely innocuous objects. In cases where the densities of such objects are similar, it can become impossible to discern from such data which constitutes a threat and which does not. A similar problem can occur when the density and path length product for two objects is substantially the same notwithstanding that they are formed of different materials. As a simple illustration in this regard, a four inch by four inch by three inch block of steel may look the same using two-dimensional radiography as a four inch by four inch by 1.75 inch block of lead notwithstanding that these two materials have considerably different densities.

This, in turn, can greatly increase the unreliability of a security screening process that relies upon such data and/or can greatly increase the amount of extra time that must be committed to following up with each such ambiguous image interpretation. In either case, these existing processes are heavily dependent upon human interpretation and hence are labor intensive and heavily prone to error due to human frailties of one kind or another.

BRIEF DESCRIPTION OF THE DRAWINGS

The above needs are at least partially met through provision of the method and apparatus to facilitate using fused images to identify materials described in the following detailed description, particularly when studied in conjunction with the drawings, wherein.

Figure 1:
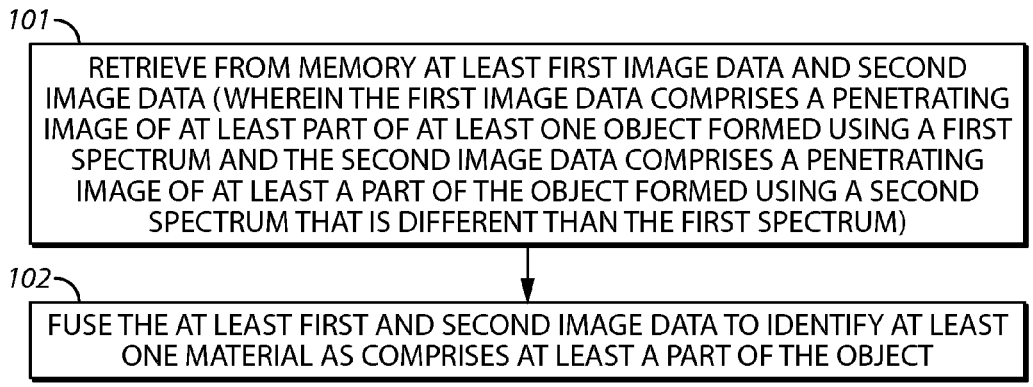
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, first image data (which comprises a penetrating image of an object formed using a first detected spectrum) and at least second image data (which also comprises a penetrating image of this same object formed using a second, different detected spectrum) is retrieved from memory and fused to facilitate identifying at least one material that comprises at least a part of this object. The aforementioned first detected spectrum can comprise, for example, a spectrum of x-ray energies having a high typical energy while the second detected spectrum can comprise a spectrum of x-ray energies with a relatively lower typical energy. By another approach, more than one spectra may have the same typical energy but differ in the distribution of energies within the spectra. By yet another approach, a same energy source can be used while relying upon different detector responses to yield similar results By one approach, this process can associate materials as comprise the object with corresponding atomic numbers and hence corresponding elements (such as, for example, uranium, plutonium, and so forth). (Those skilled in the art will recognize that, for compounds (such as water, salt, or the like), mixtures, or multiple objects that occlude each other (such as an object located behind some shielding), these atomic numbers are effective atomic numbers.) By another approach, if desired, this process can associate materials as comprise the object with corresponding material numbers, material descriptors, or other material descriptions that are analogous to, but different from, atomic numbers. These teachings will also accommodate, if desired, using higher order components to further differentiate various materials (for example, to differentiate different mixtures having the same effective atomic number).

For the sake of simplicity and clarity, the description provided herein will tend to presume that only a first and second image data (as pertain to penetrating images of an object formed using corresponding different detected spectrum) are being employed. It should be understood, however, that such a presumption serves only in an illustrative capacity as these teachings can be employed when using any number of a plurality of penetrating images as result through use of any number of different detected spectrums. As some examples in this regard, see, for example, the aforementioned patent application entitled METHOD AND APPARATUS TO FACILITATE USING MULTIPLE RADIATION-DETEC- TION VIEWS TO DIFFERENTIATE ONE MATERIAL FROM ANOTHER. Accordingly, it shall be specifically understood that the scope of these teachings is not limited to the use of only two such image data.

These teachings will accommodate various ways of facilitating the aforementioned fusing of the first and second image data. By one approach, for example, this fusing can be carried out by estimating a material number as a function of pixel values. By another approach, for example, this fusing can be carried out as a function of mismatch between the two sets of data (such as, but not limited to, mismatch that is determined as a function of pixel values). By another approach, this fusing can comprise regularizing image data as a function of roughness (where the roughness might correspond, for example, to material descriptors as correspond to these images). By yet another approach, this fusing may rely upon regularizing both a common-mode image and a material image. These teachings will also readily accommodate a combination of multiple approaches in these regards. For example, these teachings will accommodate fusing such image data as a function of mismatch and also regularizing the image data as a function of roughness to thereby facilitate identifying a particular material identifier image that minimizes a compromise between a measure of mismatching and the measured roughness.

Other possibilities exist in these regards as well. For example, these teachings will accommodate fusing the image data by use of one or more model functions. Numerous possibilities exist in this regard. Such an approach can also, if desired, make use of model coefficients that are determined via a calibration process (wherein the determination of such coefficients may make use of an empirical approach and/or a mathematical approach).

So configured, those skilled in the art will recognize and appreciate that these teachings provide for readily and reliably identifying one or more materials of interest as comprise all or part of an otherwise occluded object to thereby facilitate ascertaining whether that object is an object of interest. These teachings can be employed to better facilitate human-based interpretation and decision making and/or automated processing of large quantities of objects. It will further be appreciated that these teachings can be employed with traditional image rendering techniques to thereby provide information to an observer (and/or an automated analysis platform) of both the shape of a given object and its constituent material components. It will also be appreciated that these teachings are highly scalable and will accommodate a wide variety of penetrating image energies and source spectra, detector response characteristics, source and detector geometries and configurations, information and image displays, and application settings in a highly economical and efficient manner.

These and other benefits may become clearer upon making a thorough review and study of the following detailed description. Referring now to the drawings, and in particular to FIG. 1, an illustrative process that is compatible with many of these teachings will now be presented.

This process 100 provides for the step 101 of retrieving from a memory at least first image data and second image data. By one approach, the first image data comprises a penetrating image of at least part of at least one object formed using a first detected spectrum while the second image data comprises a penetrating image of at least a part of the object formed using a second detected spectrum that is different than the first detected spectrum. For example, the first detected spectrum can comprise a source spectrum of x-ray energies that are generated using a high typical energy value (such as a source potential of around 6 MV-9 MV) while the second detected spectrum can comprise a source spectrum of x-ray energies that are generated using a relatively lower typical energy (such as a source potential of around 3 MV-6 MV).

As another example, the first detected spectrum can comprise a source spectrum of x-ray energies (such as a source potential of around 3 MV-9 MV) that is detected by a first detector with a first spectral response, and a second detected spectrum can comprise the same source spectrum, detected by a second detector with a second spectral response. Three or more spectra can be achieved, for example, by extending the above examples to include three or more source spectra, or three or more detector responses, or by using multiple source spectra and detecting each source spectrum with multiple detectors with different spectral responses.

Note that these conditions do not prohibit the existence of some degree of overlap between the ranges of values that comprise each such source spectrum of x-ray energies or each detector spectral response. (As used herein, the expression "penetrating image" will be understood to comprise an image, such as a digital image, that is formed by and from energy that penetrates an object as versus, for example, an ordinary photographic image that is formed by and from visible light energy that is reflected from an object. Images formed using x-rays are but one (very well known) example in this regard.)

For many application settings, it will be useful if these two images correspond to essentially a shared portion and field of view of the object. This, as will become clearer below, may facilitate subsequent processing steps. Those skilled in the art will understand, however, that these two images do not necessarily need to exactly match one another on, for example, a pixel by pixel basis.

By one approach, the first image data and second image data are spatially registered with respect to one another. Facilitating this can involve, for example, measuring the displacement between the images by measuring the positions of each acquired view using a physical position encoder to calculate displacements between the images. (For an interlaced source with one detector, a two-pass scan with one source and one detector, or one source with two detectors with different spectral responses, this can include measuring the positions of both detected spectra with the same position encoder.) When there are two imaging chains, this can include calibrating ahead of time the corresponding difference between the coordinates of each imaging chain on their respective encoders.) By another illustrative approach in this regard, this can comprise measuring the relative displacement between the images through a software-based registration algorithm as will be well understood by those skilled in the art.

Note that such software-based registration approaches can also be used to measure types of displacements that may not be possible with a position encoder alone, such as repeatable time-varying displacements (such as, for example, repeatable wobbles that occur due to a warp of the gantry rails at a particular location), non-repeatable time-varying displacements (such as, for example, random mechanical vibrations), or relative tilts or in-plane shifts between detector planes. One could also use a combination of approaches. For example, one could obtain course registration from the position encoders and then do a dynamic refinement step via a software registration (using the encoder method to make an initial guess). As another example, using two separate sources, each of which are interlaced (for a total of four source spectra), one could calibrate the difference between the two sources (for example, by measuring the difference between position encoders) and use a simple time shift to handle the interlacing within each source.

In any event, following the determination of this measurement, this activity can then involve, for example, resampling the data so that the two images are aligned with one another to some acceptable degree. This might comprise complete and exact alignment in all dimensions of interest or may comprise substantial alignment (where at least some required minimum portion of the images are aligned with respect to one another to some specified tolerance). Those skilled in the art will appreciate that other possibilities may exist in this regard as well. For example, by one approach, instead of using resampling per se, one might leverage a mismatch function of choice that takes such displacements into account in some other compensatory manner.

In any event, this process 100 then provides a step 102 for fusing this at least first and second image data to identify at least one material as comprises at least a part of the object. There are various ways by which this material can be identified and/or the information then rendered in a form useful to an end user. For example, by one approach, in many application settings one may identify the material, at least in part, by describing the material as a function of atomic numbers. (As used herein, the expression "atomic number" will be understood to refer to, for a pure element, the number of protons that are contained with the nucleus of an atom of the material at issue, or for a compound or mixture of elements, the number of protons in an atom of a pure element whose physics response to the available spectra is similar to the material at issue. For example, the atomic number for uranium is 92, and the effective atomic number for water is usually between 6 and 8.) By another approach, one may identify the material by describing the material using an arbitrary scale of material class numbers (for example, water is 1.0, aluminum is 2.0, steel is 3.0, lead is 4.0, and other materials having their own corresponding material class numbers as appropriate to the needs of a given application setting). Those skilled in the art will appreciate that one may also use non-integer values if desired. This may be helpful, for example, when dealing with a combination of two elements where the combination may best be represented by some non-integer value that is between the integer values for these two elements.

Furthermore, one may identify a given material by producing several descriptions of each material (or, if you will, each pixel in the corresponding image(s)). One such description is the material number (or "1st order material number") described in the preceding material. Another such description is a common-mode image (or "0th order material number") that describes the commonality between a first and second image data. For example, this common-mode image can be, for a given pixel, the average value across all of the image data for that pixel location. By another example, this common-mode value for some given pixel can be some value that is similar to the values for that pixel in all of the image data. By another example, this common-mode value can be a prediction for the noise-free value for the first image data (made using the noisy image data). By another example, the common-mode value can be some function of the value described in one of the above values.

By another example, the common-mode value can be an estimate of the total projected density (for example, the product of density multiplied by path length). Another such description could comprise a 2nd order material descriptor. That is, whereas a 1st order material number describes the apparent material but often cannot be used to differentiate certain specific mixtures, a 2nd order material descriptor can quantify the difference between different mixtures that have the same 1st order material descriptor. The 2nd order material descriptor, for example, can be found for three or more spectra by measuring the largest direction of signal variation in N-space (where N is the number of detected spectra) that is substantially orthogonal to both the common-mode and 1st order material descriptor (note that up to an (N−1)th order material descriptor can similarly be found for N detected spectra by generalizing this idea). It may also be possible, for example, to generate an Nth order material descriptor even without having (N+1) different spectra by taking into account spatial information, a-priori object information, or a-priori knowledge of material properties such as density. For example, with two spectra one can still find an image of $1^{st}$ order material numbers, a projected density image, and an estimated path-length image.

The applicant has determined that there are various ways by which this fusing step 102 can be carried out. For example, by one approach, this step can comprise, at least in part, fusing the image data as a function of mismatch. Using this approach, for example, one can determine the corresponding mismatch to be least when the pixel values as correspond to the image data are consistent with corresponding material descriptors as correlate to each of the pixel values.

As an example of another approach in these regards, this step can comprise, at least in part, regularizing the image data as a function of roughness. As used in this context, "roughness" can be determined to be relatively less, for example, as the material descriptors form regions that are more smooth, or by another example, as the common-mode image forms regions that are more smooth, or by another example, as both the material descriptors and common mode images form regions that are smooth. By one approach, "roughness" can have a corresponding measurement that is influence by a parameter that describes a spatial scale over which such smoothness is judged, or by another approach, the penalty function may be weighted by some weighting parameter (which may also optionally, if desired, be related to spatial scale). For the purposes of many application settings, this measurement of "roughness" should be such that the measurement does not significantly penalize abrupt changes in material description that occur at a boundary between regions of different homogenous materials.

For example, smoothness can be measured by measuring a function of the 1st or 2nd derivative (where a larger derivative corresponds to "less smooth," and the penalty function generally increases with the derivative value). In turn, not penalizing abrupt changes in the material description can be accomplished by choosing the function of the derivative such that that the increase in penalty value from medium derivative value to high derivative value is not as severe as the increase in penalty value from small derivative value to medium derivative value.

It may also be useful in numerous application settings if this measurement of "roughness" can also be influenced by a parameter that describes an effective edge threshold (i.e., a parameter to control (either directly or indirectly) when variations are treated as noise that should be smoothed out and when they are treated as true object features that should be sharply preserved). This parameter can be expressed in units that are convenient for the algorithm, or in units that are convenient for the user; for example, by expressing a desired material resolution value or a desired common-mode value resolution value. Those skilled in the art will recognize that some other choices of roughness function may include no such parameter (such as "total variation" regularization).

The applicant has also determined that combinations of steps such as those described above can serve well in some application settings to enable the described fusion activity. For example, by one approach, fusing the first and second image data can comprise fusing image data as a function of a mismatch (for example, as described above) and also regularizing the image data as a function of roughness. In such a case, one can then identify the particular material as a function, at least in part, of minimizing a compromise between mismatch and roughness (as typically it will be difficult to minimize both independently with a single "answer").

The applicant has identified yet other approaches that will serve to facilitate this fusion step 102. By one approach, for example, this step of fusing a first and second image data to identify at least one material as comprises at least a part of this object can comprise optionally smoothing the first and second image data, then combining the first and second image data to provide combined image data and then smoothing this combined image data. By one approach, this might comprise smoothing the combined image data in a manner that includes implicit edge preservation. The latter, for example, can be accomplished by regularizing the combined image by simultaneously fusing the image data as a function of a mismatch and also regularizing the image data as a function of roughness (as alluded to earlier above). By another approach, this might comprise smoothing the combined image data in a manner that includes explicit edge preservation. As but one illustrative example in this regard, smoothing the combined image data in a manner that includes explicit edge preservation can comprise using a barrier-impeded filtering approach (as described below in more detail).

Yet other approaches are applicable as well, depending upon the needs and/or opportunities as tend to characterize a given application setting. For example, if desired, the aforementioned smoothing of the combined image data can comprise using the combined image data in a manner that includes both implicit edge preservation as well as explicit edge preservation.

In another approach, the combining operation may produce multiple values, for example when the material is ambiguous for a given pixel. In this case, the combined image may contain a list of candidate values for each pixel. A suitable smoothing approach may therefore involve a voting process, wherein all the pixels cast votes for each of their candidates, and the material for a region is decided as the one receiving the most votes.

It is also possible to use several approaches together. For example, it may be advantageous to generate a material image with lists of candidate values and perform a voting process to obtain an estimate for the material image, and then refine the material image by searching for the image that minimizes a compromise between mismatch and roughness, using this estimate as the initialization.

The applicant has also determined that this fusion and identification step 102 can comprise, if desired and at least in part, fusing the image data by use of at least one model function. This can comprise use of one or more model functions where each model function calculates a predicted value of the material descriptions from the at least two sets of image data, and the mismatch of a certain estimation for the material descriptors is a function of a difference between these predictions and the material descriptors estimation. The model functions may furthermore produce one or more confidence metrics for the predicted values. These confidence metrics might assign scores to each predicted value, where a higher score represents higher confidence. Or, if desired, the confidence metrics may only indirectly relate to confidence, such as by quantifying the expected standard deviation of the value (whereas the predicted value can be thought of as the expected mean value). Some non-limiting examples of confidence metrics might comprise a confidence percentage (relating, for example, to a probability that a given answer is correct to within a given atomic number range), a noise value (relating, for example, to the standard-deviation of the material number estimate), or the like.

By another approach, model functions can calculate at least one predicted image for a function of at least one set of image data as a function of at least one other set of image data or a common mode image, and from an estimation for the material descriptors, and where the mismatch for a certain estimation of the material descriptor(s) is a function of a difference between measured values and these predictions. If desired, and as appropriate to the application setting, one or more of the model functions can also be a function of a corresponding detector channel number and/or the position of the source, detector, and/or scan object (that is, system geometries), and/or a reading from a reference detector or signal quality detector (for specifics in such regards, see U.S. patent application Ser. No. 12/048,005 as filed on Mar. 13, 2008 and entitled RADIATION SYSTEM AND RADIATION BEAM QUALITY DETECTOR AND METHOD, the contents of which are fully incorporated herein by this reference), and/or the registration displacement parameters. This approach can be useful at times because different portions of a scanning beam can have different energy spectra and further because when moving the source(s) and/or detectors (for example, on rails), the detected spectra may also change as a function of the positioning of system apparatus (such as, for example, a corresponding gantry) or as a function of time (such as, for example, to account for electronic fluctuations, or random fluctuations of the source spectrum). In addition to these possibilities, the model function may also include any number of other parameters, such as information from a temperature sensor or other environmental sensor, a priori knowledge of the object contents, or information obtained from another scanning modality.

If desired, such a model function can comprise a parametric function of at least two inputs and can also use at least one model coefficient. Those skilled in the art may appreciate that such a parametric approach might include a polynomial-based approach, a Chebyshev series approach, a Fourier series approach, a spline-based approach, a table-interpolation approach, a physics-based approach or the like (including combinations of several of the above). Such an approach may accommodate, for example, warping one or more of the at least two such inputs, calculating the corresponding output, and then warping that output to obtain the desired result. (As used herein, this reference to "warping" will be understood to include functions having a same number of inputs and outputs as well as other mapping-like functions where the number of inputs and outputs may differ. For example, a ratio of two numbers can serve in these regards.)

Additionally, the predictor model may have another input for location, such as channel number, or some function of channel number (such as the magnitude of the angle relative to beam center), or some warping of channel or beam angle. In some cases, such as when location is defined by a beam angle, the user may need to provide some description of at least the approximate system geometry. Additionally, the predictor model have a further input (or inputs) from a beam quality detector, or yet further inputs to describe the registration displacements.

For the illustrative example of two detected spectra using two source energies (high and low energy), the warping functions, for example, may attempt to separate the two measurements into two disjoint components. The first warping function (perhaps usefully viewed as a penetration function) is substantially a function of the amount of mass seen by the beam and substantially independent of the type of material (for example, it could be the log of the high-energy attenuation reading, the log of the low-energy attenuation reading, or some form of average of the two). In one approach, this warping function can also be used to produce the common mode image.

The second warping function (perhaps usefully viewed as a discriminator function) serves to substantially quantify the material for the given value of the first function. This second warping function, for example, could be the low-energy data itself, the ratio of the low-energy data to the high-energy data, or it could be a geometrically weighted ratio of the low-energy data to the high-energy data, or it could be a difference between a warping of the low-energy data and a calibrated warping of the high-energy data where the warping itself is determined by calibration. For example, the calibrated warping might be determined by fitting the log of the low-energy data as a function of the log of the high-energy data (such as using a polynomial or a table-interpolation approach), then the discriminator function calculates the difference between the measured low-energy log value and the low-energy log value predicted by the calibrated warping of the measured high-energy log value.

The calibrated warping may also be determined by fitting only a specific material, such as steel. For example, the calibrated warping might be determined by fitting the log of the low-energy steel data as a function of the log of the high-energy steel data, then the discriminator function calculates the difference between the measured low-energy log value and the predicted low-energy log value from calibrated warping of the measured high-energy log value. As another example, the calibrated warping might be determined by measuring the ratio of the low-energy steel data to the high-energy steel data and fitting this ratio as a function of the log of the high-energy steel data, then the discriminator function calculates the ratio between the measured ratio and the predicted ratio using the calibrated warping of the measured high-energy data.

With a calibrated warping, by one approach calibration can be considered a two-step process, where the first step is to calibrate the discriminator function, and the second step is to calibrate the material predictor. By another approach, calibration can be considered a single step that determines the coefficients for both the calibrated warping and the model function. By one approach, the coefficients for the model function and calibrated warping can be stored in separate calibration tables. By another approach, the coefficients from the model function and calibrated warping can be lumped together into what can be considered a single set of calibration coefficients. It should be noted that other warping functions can be calibrated in this manner as well, and some model functions could be considered to undergo a many-step calibration process.

In some applications it may be especially desirable to be able to take the partial derivatives of the model function (examples will be clarified later, but include fast searching algorithms and automated noise prediction). For simple analytic models, like polynomials, Fourier series, or Chebyshev series, the derivatives may be found analytically, as known in the art. For physics-based models, such as the Beer-Lambert equation, the derivative functions may similarly be calculated analytically. For interpolation-table bases, the derivative may be calculated by analytically calculating the derivatives of the interpolation kernel, then applying the derivative kernels. For model functions that use warping functions, the effect of the warping function on the derivative may be incorporated analytically by using the chain rule.

The aforementioned model coefficient (or, more likely, "coefficients") can be determined, if desired, via calibration. This, in turn, can comprise determining such coefficients using one or more empirical approaches and/or one or more mathematical approaches of determining such coefficients.

Figure 2:
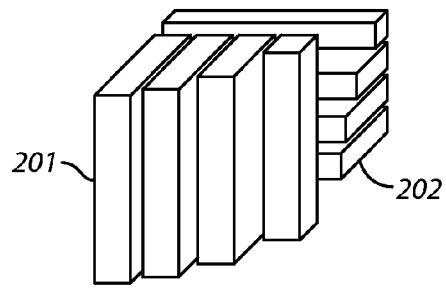
FIG. 2 comprises a perspective view as configured in accordance with various embodiments of the invention.

Using an empirical approach can comprise, if desired, using one or more calibration objects as is known in the art. Referring now to FIG. 2, one such calibration object can comprise a stepped wedge 201 as is also known in the art. Such a stepped wedge 201 is typically comprised of a substantially homogenous material such as water (in a suitable container), lead, plastic, aluminum, steel, tin, wood, or the like. The varying depths of the various steps of the stepped wedge 201 provide correspondingly varying results when imaging such a calibration object using a given imaging apparatus. By positioning the stepped wedge such that at least some penetrating energy as is used to empirically gather information that is used to determine the aforementioned coefficients must pass through the stepped wedge 201, a resultant data set is achieved. This data set, in turn, can be readily employed to effect the empirically-based calibration of the imaging apparatus.

Each stepped wedge might be a single assembly (for example, carved from a large block of a given material). By another approach the stepped wedge can comprise a single assembly made by affixing various slabs of a given material together using an adhesive, tape, screws, gravity, interlocking tabs, rope, welding, or other attachment mechanism. By another approach, this may involve a shaped container filled with the material of interest (which is useful for example for liquids or for powdered materials). By another approach, the stepped wedge can comprise multiple assemblies, where each are made using one of the above methods (from a practical or safety standpoint, for example, it may be useful to keep each piece to 40 pounds or less). The stepped wedge can also comprise a set of discrete blocks that are unattached to one another but are simply placed next to each other in the scanning field (for example, for materials that are dangerous to reshape, such as uranium, or for pre-shaped off-the-shelf items such as containers of water). One might also employ a combination of assemblies and blocks if desired. Generally, the choice of a best construction technique will depend on the choice of material and the application setting.

The applicant has determined that, in at least some cases, it may also be advantageous to employ both a first stepped wedge 201 comprised of a first material as described above in combination with a second stepped wedge 202 that is comprised of a second material that is different from the first material, wherein the second stepped wedge 202 is disposed substantially normal to the first stepped wedge 201. Though such an approach differs markedly from prior practice, by then positioning the combined resultant calibration object such that at least some penetrating energy as is used to empirically gather information that is used to determine the aforementioned coefficients must pass through both the first stepped wedge 201 and the second stepped wedge 202, a considerably enriched resultant data set is achieved. This data set, in turn, can be readily employed to effect, with greater precision and certainty, the empirically-based calibration of the imaging apparatus.

If desired, this resultant data set can be further enlarged and enriched by making several calibration scans that are performed with different combinations of such calibration objects. For example, one might take three dual-material calibration scans, the first employing a stepped wedge 201 comprised of plastic and a second stepped wedge 202 that is comprised of aluminum, the second employing a stepped wedge of aluminum and a stepped wedge of steel, the third employing a stepped wedge of steel and a stepped wedge of lead.

Alternatively, one might take, for example, eight single-material calibration scans, the first employing only a plastic stepped wedge, the second employing only a water stepped wedge, the third employing only a wood stepped wedge, the fourth employing only an aluminum stepped wedge, the fifth employing only a steel stepped wedge, the sixth employing only a tin stepped wedge, the seventh employing only a lead stepped wedge, and the eighth employing only a depleted uranium stepped wedge. Alternatively, one might acquire some combination of single-material and dual-material scans. As yet another alternative, each scan might contain more than one stepped wedge (or pair of stepped wedges) in positions next to each other (rather than in front of each other). For example, rather than the above example of taking eight scans, one could place the plastic, water, wood, aluminum, steel, tin, lead, and uranium stepped wedges sitting next to each other to achieve the same result in a single scan. Those skilled in the art will understand that the particular materials suggested and the number of materials/scans suggested serve only in an illustrative manner and are not intended to suggest any particular limitations in these regards.

One might also choose to scan a stepped wedge and then scan that stepped wedge again with a block of material behind it. This might be performed when a stepped wedge is costly, dangerous, or otherwise prohibitive to make. One might therefore choose to make a small stepped wedge of a given material, and obtain longer path lengths of that material by adding blocks of the same material. Or alternatively, one might scan a stepped wedge of one material, in line with a block of another material. Or one might scan a stepped wedge of one material, in line with a stepped wedge of a second material disposed substantially normal to the first, and a block of a third material further in line. This last approach can be repeated for blocks of different thickness and/or different material in order to calibrate different tri-material mixtures.

One might also scan the same stepped wedge, or combination of stepped wedges, at multiple positions within the beam. For example, for a truck scanner, the source spectra at the center of the beam may be different than the spectra away from the center. Therefore, it may be preferable to assemble shelves so that there are platforms at several heights, then perform a set of scans so that most materials (or pairs of materials) are scanned at least once on each shelf. This gives location-dependent calibration data that allows one to calibrate a predictor that has a location input. One may also take a scan with blocks or stepped wedges on multiple shelves simultaneously. It may be desirable that shelves used in this way are focused on the source (that is, with each shelf independently tilted to be in line (or nearly so) with the X-rays that intersect it), to eliminate parallax on the stepped wedge. Yet another approach is to provide a motorized shelf (or shelves) that move the calibration objects in the channel direction, so that one can obtain a spatially dense set of calibration data with reasonable effort.

In any event, determining such coefficients using an empirical approach can comprise collecting a set of data points from different locations within the penetrating images, each consisting of a material descriptor (as known or as calculated from the calibration scene (where the expression "scene" will be understood to refer to the physical background of the application setting, the calibration objects themselves, the placement and arrangement of the objects, specific equipment settings, and so forth)) and one or more measured pixel values in each penetrating image for the region as corresponds to the material descriptor. For example, by one approach, one can measure the mean value or median value of a region and fit to that (hence effectively using what amounts to a typical pixel value). By another approach, one could simply use all of the available values without combining them and then fit to all of them. If desired, this may also optionally comprise further using a measured noise value in each penetrating image for the region corresponding to the material descriptor and using these data points to determine the optimal predictor coefficients. (One might also collect noise values, reference readings, beam quality measurements, common mode values, higher order descriptors, and so forth, either in lieu of the foregoing or in combination therewith.)

If desired, one may then perform a database-style filtering of these points to remove any points that satisfy some exclusion criteria and/or that do not satisfy some inclusion criteria. For example, one might choose to discard any points with insufficient path length, excessive path length, excessive noise, excessive parallax, points corresponding to bad detector pixels, points corresponding to momentary deficiencies in a source spectrum, or points where the physical processes for material identification are known to break down.

Those skilled in the art will appreciate that other variations in these regards are possible to achieve the aforementioned fusion result. For example, instead of working with actual values per se, if desired, this step of fusing the first and second image data can comprise, at least in part, fusing the image data by use of a straight ratio or a geometrically-weighted ratio between corresponding data in the two image data sets, by use of a calibrated discriminator function, and so forth. Such approaches may better accommodate the working paradigm of application settings that employ multi-spectral x-ray image capture and processing.

To determine the model coefficients, one might perform standard fitting methods on the collected set of data points. For example, one might use standard least-squares fitting to determine the coefficients when the model function incorporates polynomials or Fourier series. When the model function incorporates table-interpolation, the coefficients might be determined, for example, by using the collected data directly as the coefficients. Alternately, as another example for a model function incorporating table-interpolation, the interpolation table values may be found by finding the table values that are near the measured data and optionally that also follow a smoothness constraint (by way of illustration, specific examples of this include a thin-plate spline model or a diffusion model).

As an alternative to an empirical approach, one might also consider a mathematical approach. Using a mathematical approach can comprise analytically describing the physics of the scanning and detection processes using known physics models, such as the polychromatic Beer-Lambert equation (possibly modified for other phenomena such as scatter and detector effects). In the event that the source spectrum is varying over time, the approach of using physics models can be especially useful when coupled with a beam-quality detector, since beam quality information can be straightforwardly incorporated into a physics model to account for spectral variations.

One might furthermore use both an empirical and a mathematical approach, wherein the mathematical approach comprises using known physics models where the physics models include some unknown parameters (such as spectral coefficients, scatter coefficients, or background radiation levels) and these parameters are then measured using an empirical approach.

The process 100 illustrated can be performed in discrete steps as shown. In such a case, the image data information is completely retrieved from memory followed by the fusion and identification step. If desired, however, the fusion and identification step can begin before the image data is completely available. This approach may be useful, for example, when the image data is being presently collected. In such an application setting, the fusion and identification step can begin even as the image capture process is underway (using data as it becomes available). For some types of fusion steps, this concurrent processing can be straightforwardly accomplished by generating a new material number for each image pixel once all of the corresponding data for that pixel arrives. Alternatively, when the fusion step is iterative in nature (such as for a method involving regularization), and again if desired, the fusion step can be performed through iterative updates that refine portions of the material description as correspond to those portions of the first and second image data that have been collected and have not yet converged or are nearby to portions that have not yet converged.

Figure 3:
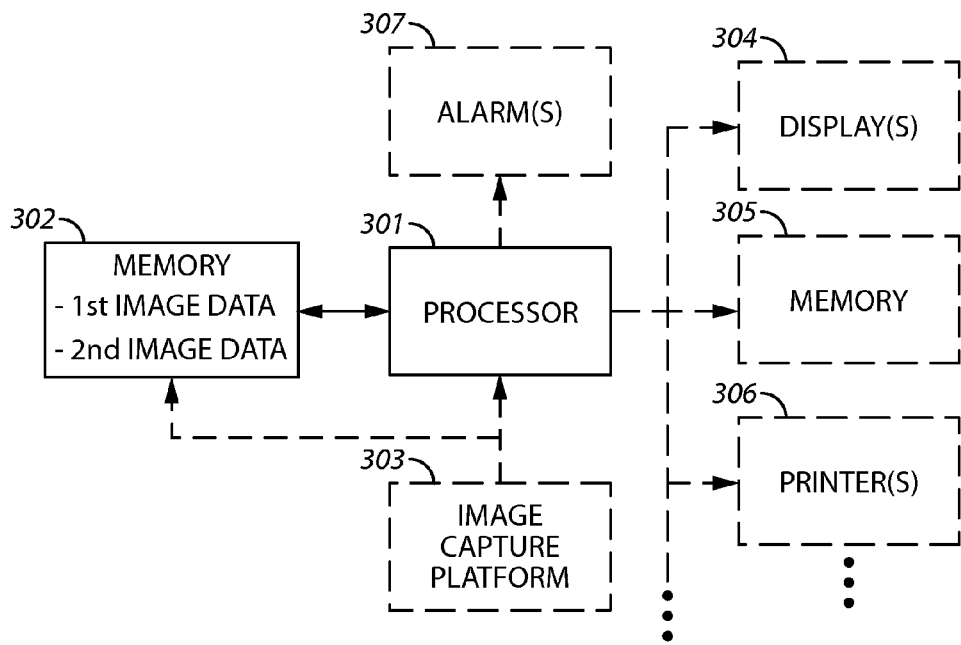
FIG. 3 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

This platform can comprise a processor 301 that operably couples to a memory 302 having at least the aforementioned first image data and second image data stored therein. This content has been originally sourced from essentially any remote or local source as desired. These teachings will also accommodate having the platform itself capture such information in the first instance. By this approach, for example, the platform can further comprise an image capture platform 303 of choice that operably couples to the processor 301 and/or the memory 302 to provide such image data as captured. Image capture platforms that employ penetrating energy are well known in the art. Accordingly, for the sake of brevity and clarity, further elaboration in this regard will not be provided here.

Those skilled in the art will recognize and appreciate that such a processor 301 can comprise a fixed-purpose hard-wired platform or can comprise a partially or wholly programmable platform. All of these architectural options are well known and understood in the art and require no further description here. For the sake of this illustrative explanation, it will be presumed that this processor 301 comprises a digital computer of choice wherein the processor is further configured and arranged (via, for example, corresponding programming as will be well understood by those skilled in the art) to carry out one or more of the steps, actions, and/or functions described herein.

As illustrated, and as desired, this processor 301 can comprise an output that can serve to receive the aforementioned identification of the material (or materials) that comprises the object in question. This output can couple as desired to one or more displays 304, additional (local or remotely located) memory, and/or one or more printers 306, to note but a few examples in this regard. This processor 301 can also be optionally coupled, if desired, to one or more alarms 307. So configured, the processor 301 can be programmed, for example, to automatically cause a local and/or remote alarm to be provided when a particular identified material corresponds to a material of concern. This can comprise a fairly simplistic approach, as when such an alarm is triggered solely upon detecting a given material number. These teachings will also accommodate greater complexity in this regard, as when the alarm is triggered upon detecting some disallowed combination of penetration value, material number, material noise value, estimated path length, minimum region size, clutter material (as may relate, for example, to the material of a shield that appears to be obscuring another object of potential interest), object shape, and/or other metrics of interest and choice.

Those skilled in the art will recognize and understand that such an apparatus may be comprised of a plurality of physically distinct elements as is suggested by the illustration shown in FIG. 3. It is also possible, however, to view this illustration as comprising a logical view, in which case one or more of these elements can be enabled and realized via a shared platform. It will also be understood that such a shared platform may comprise a wholly or at least partially programmable platform as are known in the art.

For the interested reader, further details will now be provided regarding various aspects of these teachings. Those skilled in the art will appreciate and recognize that the use of such examples is intended to serve only in an illustrative context and is not intended to serve as an exhaustive or otherwise limiting example in this regard.

For conventional x-ray systems with a single source and a single detector with a fixed spectral response, one can measure the attenuation of an object, but not its composition—i.e. one cannot in general tell the difference between a thin slab of a dense substance versus a thicker slab of a less-dense substance. Notwithstanding this obstacle, and as noted earlier, it can be useful to be able to differentiate between high-Z substances such as Uranium or Lead (as lead might be used to shield radioactive materials) on the one hand and other substances such as steel or aluminum on the other hand. In other cases, it may be useful to discriminate low-Z organic materials from medium-Z inorganic materials or even organic materials from other organic materials, such as discriminating potatoes from cigarettes.

These needs can be addressed (as noted above) by exploiting the material-specific energy-dependence of an object's attenuation coefficients. This can be done by measuring two or more attenuation values, each corresponding to a different x-ray detected spectrum. This can comprise using multiple x-ray sources, using an x-ray source that switches between multiple spectra, using multiple detectors with different spectral responses, or using any combination of the above.

Once a set of multi-spectral readings has been acquired, one may estimate its Z value (where Z is defined further below) and/or classify it according to its approximate Z value. In the absence of noise this could perhaps be done independently for each pixel, though even without noise, sometimes physics does not give enough information to unambiguously differentiate certain materials. Therefore it is generally helpful (especially in the presence of noise) to take spatial information into account, for example by averaging multiple pixels, or as another example, by regularizing the image as a function of roughness.

Some existing approaches employ some kind of automatic segmentation, divide the image into regions, and come up with a material estimate for each region, or, alternatively, generating a material estimate for each pixel and then automatically segmenting the material image. The present teachings, however, will accommodate (though not require) eschewing an explicit segmentation step. Instead, one can estimate the Z image in a way where the image is mathematically encouraged to be piecewise smooth while nevertheless preserving the object's geometrical features. By combining segmentation and estimation into one unified step in this way, one can significantly improve robustness to noise. This noise immunity is particularly useful for large-scale radiography (such as cargo scanners), where, due to long metal path lengths, and due to the relatively weak sensitivity to material type (as compared, with, for example, the superior sensitivity to material number at energies used in smaller medical or luggage scanners) high-noise conditions may be unavoidable.

The following notation applies for the purpose of these illustrative examples:

| | |
|---|---|
| K | the number of detected spectra (i.e. for dual energy, K is 2) |
| k | the index of the spectrum, $1 \leq k \leq K$ |
| $X_{i,j}(k)$ | value at pixel (i, j) from the $K^{th}$ spectrum, $k = 1 \ldots K$ |
| $Z_{i,j}$ | descriptor for the material in pixel $X_{i,j}(\cdot)$. |
| M | the desired number of descriptors (usually $M \leq K$) |
| $\Omega_{i,j,m}$ | m-th order descriptor for the material in pixel $X_{i,j}$ |
| $\sigma_{i,j,m}$ | standard-deviation of $\Omega_{i,j,m}$ | where for the purpose of these examples, the values are normalized such that substantially $X_{i,j}(k)=1$ through air and $X_{i,j}(k)=0$ through a completely opaque object. (Those skilled in the art will understand that these characterizations are represented as being "substantially" as shown because noise, scatter, background radiation, source fluctuations, and electronic effects as typically occur in a real-world practical application setting will often prevent these variables as being exactly as represented.)

(Depending on the choice of mismatch function (below), Z is either analogous to atomic number, or directly equal to effective atomic number.) In addition, the following notation applies for the purposes of first describing what might be viewed as an open loop approach for dual spectra.

| | |
|---|---|
| L | the low-energy data (same as X(1)) |
| H | the high-energy data (same as X(2)) |
| $\overline{Y}$ | the ideal material-number data |
| A(H, L) | the penetration function |
| B(H, L) | the discrimination function |
| C(ch) | the location function |
| Y(A, B, C) | the material function |
| (Y) | the output function. |

During calibration, for each data point, we will know (from phantom design and/or physics calculations) values for $\overline{Y}$—a number identifying each material. It can be, for an example, an effective atomic number, $Z_{eff}$ or some function of such a number, such as $\overline{Y}=\sqrt{Z_{eff}}$. $Z_{eff}$ is straightforward for a single-material stepped wedge of a material that is predominantly a single element (say, an aluminum stepped wedge, a steel stepped wedge, or a lead stepped wedge), but for more complex materials (such as a plastic stepped wedge, or a superimposed aluminum stepped wedge and steel stepped wedge) it can be more ambiguous. There are methods (known in the art) for calculating an effective Z number for complex materials. For example, for some nominal spectrum value (for example, if we were switching between 4 MV and 6 MV, we could pick a 5 MV nominal value), one can determine a value for effective Z by estimating what pure element would have similar attenuation properties as the known combination of materials. Similarly, instead of a nominal spectrum, one could also empirically estimate a spectrum from the calibration data and then use this estimated spectrum to estimate effective Z.

A simpler approach is to simply take a mass-weighted ratio of materials. That is, for a mixture of M materials, each with atomic number $Z_m$ and density $\rho_m$, for m=1 to M, one can calculate a mass weighted Z-value, $$Z_{avg} = \frac{\sum_{m=1}^{M} \rho_m Z_m}{\sum_{m=1}^{M} \rho_m}$$

Note that this does not have the same physics explanation as the $Z_{eff}$ parameter, and may not offer much useful physics interpretation for mixed materials. Nevertheless, it can still provide a useful description of a complex material.

Taking this idea a step further, we may abandon a physics interpretation altogether and simply assign human-interpretable class numbers to different materials—for example, plastic=1, aluminum=2, steel=3, tin=4, lead=5, and mixtures of these are assigned non-integer class numbers (so class number is actually continuous), for example by mass-weighted average:

$$K_{avg} = \frac{\sum_{m=1}^{M} \rho_m K_m}{\sum_{m=1}^{M} \rho_m}$$

where K is class number. Alternatively, one may opt for something more physics inspired. One effective measure of a material is to calculate the ratio of the half-value layer (or something similar) of the material for the high-energy spectrum to the same for the low-energy spectrum. While half-value layers are generally expressed in distance (such as cm), such values can be overly dependent on the density of the material.

Alternatively, expressing them as a mass lessens dependence on density. For example, Let $I_H(E)$ be the theoretical or measured (as with a beam-quality detector, or by estimating $I_H(E)$ from the calibration data) high-energy spectrum (in photons per unit time) (preferably including both the source spectrum and the effect of detector spectral response)

Let $I_L(E)$ be the theoretical or measured low-energy spectrum (in photons per unit time) (preferably including both the source spectrum and the effect of detector spectral response)

Let $\mu_m(E)$ be the mass-attenuation coefficient for material #m in a mixture

Let $a_{target}$ be some target attenuation value, for example a=100

Then one can calculate the attenuation $$a(v) = \int E \times I(E) \times e^{-v \times [\sum_{m=1}^{M} \rho_m \mu_m(E)]/[\sum_{m=1}^{M} \rho_m]} dE$$

Doing this for $I_H(E)$ and $I_L(E)$ respectively gives $a_H(v)$ and $a_L(v)$. Then we can search for the value of $v_H$ for which $a_H(v_H)=a_{target}$ and search for the value of $v_L$ for which $a_L(v_L)=a_{target}$. The search algorithm could be iterative, which is slow but accurate, or it could be performed by calculating a for each of a list of v values, then interpolating to find v for $a_{target}$. In practice, the interpolation approach tends to work just as well (but much faster) as the iterative method. Once $v_H$ and $v_L$ are known, the material number can be calculated by, for example, their ratio or difference. Our preferred material number calculation for at least some application settings is $$\overline{Y} = \frac{v_L}{v_H}$$

Sometimes the user may prefer to know material number on an absolute scale. In this case, fitting might use a material number based on mass-value-layer-ratios (or something else other than Z) but a final interpolation step could then interpolate from Y to Z or K. This requires some (perhaps small) list of known (Y,Z) or (Y,K) pairs, which could be provided by the user, or (preferably) could be automatically derived for some list of materials.

Once H,L,$\overline{Y}$ data is known, we apply two warping functions to generate two suitable variables for material-number fitting. Generally speaking, one warping should capture the amount in common between H and L, and the other should capture the difference between H and L. For example, one might use either $A(H,L) = -\log(H)$ or $A(H,L) = -\log(L)$ or $A(H,L) = (-\log(H) - \log(L))/2$ and the second warping could be $B(H,L) = -\log L$ (for any but the second choice of $A$, above)

$B(H,L) = -\log H$ (for any but the first choice of $A$, above)

or $$B(H, L) = \frac{L}{H}$$

(for any of the above choices of A)
or $$B(H, L) = \frac{L}{H^a}$$

where a is a suitable exponent, or
or $$B(H, L) = -\log L - \sum_{k=0}^{PolyOrder} a_k (-\log H)^k$$

where $\{a_k\}$ is a suitable set of coefficients. Of these, the preferred option for the B warping will generally be one of the last three options. The third option may be preferable from an implementation perspective, but for some spectra, the fourth or fifth options may give superior material images, while for still other spectra, the fifth option may give superior material images. The best choice can depend on the specific system details and the application setting.

The a values could be determined manually, or they could be calibrated, such as by fitting to try to make B close to 1 (for the fourth B option given above) or close to 0 (for the fifth B option given above) for all (H,L) values on average, or preferably for a set of (H,L) values measured for a typical material (such as steel). Or the a values could be determined similar to the calibration option, but using data simulated from the known spectrum.

The third warping is optional, but is helpful if beam quality changes appreciably as a function of angle. Let $\gamma(ch)$ be the angular difference between the ray going from the source to channel ch, and the ray at the center of the beam. For an asymmetric beam, one could choose the trivial warping $C(ch) = \gamma(ch)$ whereas for a symmetric beam, one could choose the warping $C(ch) = |\gamma(ch)|$ or if the geometry is unknown, one could use channel numbers directly, $C(ch) = ch$.

Other location warpings could be more appropriate if one has special insight how the beam tends to change as a function of angle, such as applying trigonometric functions to $\gamma$ or $|\gamma|$.

The material function can be implemented as a sum of bases, either inseparable, $$Y(A, B, C) = \sum_{i=0}^{M} c_i \phi_i(A, B, C)$$

where, for example, $\phi_i$ i could be a set of radial basis functions based on a set of calibration data, or $\phi_i$ could be some other set of multi-dimensional basis functions, or, preferably, the material function can be implemented as a sum of separable bases, $$Y(A, B, C) = \sum_{i=0}^{M_a} \sum_{j=0}^{M_b} \sum_{k=0}^{M_c} c_{i,j,k} \phi_i^a(A) \phi_j^b(B) \phi_k^c(C)$$

where $\phi_n$ could be, for example, a set of polynomial bases, Chebyshev bases, Fourier bases, or some combination of the above. For example, $\phi_n(x) = x^n$ are the standard polynomial bases. Note that $\phi^a$, $\phi^b$, $\phi^c$ may each be different types of bases, and each may itself be a combination of more than one type of basis. Generally, the set of bases will be chosen by a user at calibration time, as will the calibration orders $M_a$, $M_b$, and $M_c$.

Alternately, the material function can be implemented by table-interpolation, either in its in entirety, or in part (such as by using bases in the A,B directions but interpolation in the C direction). As is known in the art, there are numerous suitable interpolation kernels that could be used for table interpolation, including but not limited to linear interpolation, triangular interpolation, nearest-neighbor interpolation, cubic spline interpolation, cubic convolution interpolation, Catmull-Rom splines, Bezier curves, and the higher-dimensional generalizations of each of these. For example, one can create a table of the (A,B,C,Y) values measured during calibration (without fitting), then for a given measured set of (A,B,C) values, one can find the Y value by interpolating the table value at the measured (A,B,C) coordinates.

Alternatively, one can assume a regular grid of (A,B,C) values (where each particular (A,B,C) combination is called a "node") then perform a fitting process to find the Y node values such that, when interpolating the table at the calibrated (A,B,C) values, the interpolated Y values best match the calibrated Y values (usually with some additional smoothness constraint, such as a thin plate model or a diffusion model). In this case, the Y node values can be considered to be the coefficients of the material function. Note that though (for performance reasons) table-interpolation would rarely be implemented directly as a sum of bases, it can usually be considered mathematically equivalent to a sum of bases approach (where the bases are either separable or inseparable depending on the chosen interpolation kernel) Therefore one can often use similar fitting techniques for the bases version and the table-interpolation version to determine the material function coefficients.

The coefficients $c_{i,j,k}$ can be found, for example, by least squares fitting, where the ideal Y values are known from the calibration materials. That is, for a set of measurements $(H_n, L_n)$, n=1 to N, we calculate $(A_n, B_n, C_n)$ independently as well as the ideal value $\bar{Y}_n$, then find the coefficients that minimize $$\sum_{n=1}^{N} (\bar{Y}_n - Y(A_n, B_n, C_n))^2$$

For orthogonal bases, this fitting may be done by straightforward matrix inversion, or by principle-component versions of matrix inversion (which apply either a singular-value or eigen-value decomposition and essentially only find the components of the matrix inverse that correspond to the principle components of the data points—this approach is known in the art), or by iterative fitting. Generally, the principle-component version is fast and robust.

In the method of using separable bases, one might find values for all coefficients this way, but the fits tend to be more stable by only finding coefficients for low-order bases combinations, such as for those values where $$\frac{i}{M_a} \frac{j}{M_b} \frac{k}{M_c} \leq 1,$$

where in this equation, 0/0 is treated as equal to 1 and for all coefficients that don't satisfy this condition, set their value to 0.

The fit can be further improved by using a weighted least squares fit, where all (A,B,C) measurements are not weighted equally. That is, by minimizing $$\sum_{n=1}^{N} w_n (\bar{Y}_n - Y(A_n, B_n, C_n))^2$$

For example, they can be weighted by input noise. During calibration, we can also measure a noise value (i.e. standard deviations) for each calibration point, giving us $\sigma_H(n)$ and $\sigma_L(n)$. These can be measured either by measuring the empirical standard deviation within a region of interest, or by estimating the noise based on Poisson statistics, $$\sigma_H \approx \sigma_H^{air} \sqrt{H} \text{ and } \sigma_L \approx \sigma_L^{air} \sqrt{L}$$

where $\sigma_H^{air}$ and $\sigma_L^{air}$ are the standard deviations seen through air. Then we can estimate the noise on the A and B value as $$\sigma_A \approx \sqrt{\sigma_H^2 \left|\frac{\partial}{\partial H} A\right|^2 + \sigma_L^2 \left|\frac{\partial}{\partial L} A\right|^2}$$

and $$\sigma_B \approx \sqrt{\sigma_H^2 \left|\frac{\partial}{\partial H} B\right|^2 + \sigma_L^2 \left|\frac{\partial}{\partial L} B\right|^2}$$

where the above derivatives can be taken analytically for most useful warping functions.

Then one can take these weight levels into account during the fit. By one approach, one can weight the data by the normalized sum of the noise levels, such as by using $$w_n = \frac{1}{\frac{\sigma_A^2(n)}{s_A^2} + \frac{\sigma_B^2(n)}{s_B^2}}$$

where s represents the amount of variation in the entire data set, $$s_A^2 = \frac{1}{N} \sum_{i=1}^{N} \left(A_i - \frac{1}{N} \sum_{j=1}^{N} A_j\right)^2$$

and $$s_B^2 = \frac{1}{N} \sum_{i=1}^{N} \left(A_i - \frac{1}{N} \sum_{j=1}^{N} A_j\right)^2$$

and $w_n$ is the weighting term in the least squares fit described above.

Another approach is to perform the minimization in a way that will minimize the output noise. For example, one can perform an iterative fit as follows. First, fit the data either using some initial weights, such as using $w_n=1$ for all n, or using the weighting based on the normalized sum of the noise levels (as shown above). This gives a first estimate of the fitting coefficients. Then, calculate the noise levels using this fit, $$\sigma_Y^2(n) = \sigma_A^2(n) \left|\frac{d}{dA} Y(A, B, C)\right|_{\substack{A=A_n \\ B=B_n \\ C=C_n}}^2 + \sigma_B^2(n) \left|\frac{d}{dB} Y(A, B, C)\right|_{\substack{A=A_n \\ B=B_n \\ C=C_n}}^2$$

and repeat the fit, but this time using weights $$w_n = \frac{1}{\sigma_Y^2(n)}.$$

In this fashion, continue to update the output noise estimates $\sigma_Y^2(n)$ and the weights $w_n$ and repeat the fit. For example, to determine the optimal noise-weighted coefficients, one might perform the fit by performing four such iterations.

Taking this idea one step further, one could alternatively perform a more explicit iterative search (for example, using gradient descent) to find the coefficients that directly minimize $$\sum_{n=1}^{N} \frac{1}{\sigma_Y^2(n)} (\overline{Y}_n - Y(A_n, B_n, C_n))^2.$$

One might also combine several of the above approaches, using a simpler approach to provide an initialization for an iterative approach.

Another method for weighting the data points is to weight by local density. That is, weight each point by something proportional to, or at least inspired by, $$w_n \propto \frac{1}{\text{the number of points that are similar to } (A_n, B_n, C_n)}$$

This can be accomplished by calculating the normalized distance from each point to every other point, $$d(i,n) = \alpha_A^2 \frac{(A_n - A_i)^2}{s_A^2} + \alpha_B^2 \frac{(B_n - B_i)^2}{s_B^2} + \alpha_C^2 \frac{(C_n - C_i)^2}{s_C^2} + \alpha_Y^2 \frac{(\overline{Y}_n - \overline{Y}_i)^2}{s_Y^2}$$

where $s_A$ and $s_B$ are as before, and $$s_C^2 = \frac{1}{N} \sum_{i=1}^{N} \left( C_i - \frac{1}{N} \sum_{j=1}^{N} C_j \right)^2 \text{ and } s_Y^2 = \frac{1}{N} \sum_{i=1}^{N} \left( \overline{Y}_i - \frac{1}{N} \sum_{j=1}^{N} \overline{Y}_j \right)^2,$$

and $\alpha_A$, $\alpha_B$, $\alpha_C$, and $\alpha_{\overline{Y}}$ are all user-adjustable weights. Then the data can be weighted by $$w_n = \frac{1}{\sum_{i=1}^{N} e^{-d(i,n)}}.$$

The motivation for this is that $e^{-d(i,n)}$ is close to 1 when each distance is smaller than the corresponding s/α (i.e. when $$|A_n - A_i| < \frac{s_A}{\alpha_A} \text{ and } |B_n - B_i| < \frac{s_B}{\alpha_B}$$

etc, then points i and k are similar), and $e^{-d(i,n)}$ is close to 0 when any component's distance is larger then the corresponding s/α (i.e. two data points are dissimilar if $$|A_n - A_i| > \frac{s_A}{\alpha_A} \text{ or } |B_n - B_i| > \frac{s_B}{\alpha_B},$$

etc). Alternatively, we can calculate some weights based on the conditional local density. For example, let us say that we will calculate the unconditional density of A and C, and the conditional density of B and $\overline{Y}$. Then we can calculate the unconditional normalize distances $$d_{uncond}(i,n) = \alpha_A^2 \frac{(A_n - A_i)^2}{s_A^2} + \alpha_C^2 \frac{(C_n - C_i)^2}{s_C^2}$$

and the pairing weights, $$p(i,n) = e^{-d_{uncond}(i,n)}$$

where p is close to 1 when i and n correspond to points that have similar unconditional values (A and C in this example), and close to 0 otherwise. Then, for each point, we essentially find the local mean and variance of all the points that have similar unconditional values (this is like finding conditional mean and variance), as well as the number of points with similar unconditional values:

$$N_{local}(n) = \sum_{i=1}^{N} p(i,n)$$

$$\mu_{local}^B(n) = \frac{1}{N_{local}(n)} \sum_{i=1}^{N} B_i p(i,n)$$

$$\mu_{local}^Y(n) = \frac{1}{N_{local}(n)} \sum_{i=1}^{N} \overline{Y}_i p(i,n)$$

$$(\sigma_{B,local}^2(n))^2 = \frac{1}{N_{local}(n)} \sum_{i=1}^{N} (B_i - \mu_{local}^B(n)) p(i,n)$$

and $$(\sigma_{Y,local}^2(n))^2 = \frac{1}{N_{local}(n)} \sum_{i=1}^{N} (\overline{Y}_i - \mu_{local}^Y(n)) p(i,n).$$

Then the conditional normalized distances are $$d_{cond}(i,n) = \alpha_B^2 \frac{(B_n - B_i)^2}{\sigma_{B,local}^2} + \alpha_Y^2 \frac{(\overline{Y}_n - \overline{Y}_i)^2}{\sigma_{Y,local}^2}$$

and the density weighting is then $$w_n = \frac{1}{\sum_{i=1}^{N} e^{-(d_{uncond}(i,n) + d_{cond}(i,n))}}.$$

Note that the choice of A and C as unconditional variables and B and $\overline{Y}$ as conditional variables is not necessary, and other combinations of conditional and unconditional variables may be used.

Though the above describes how to calculate the weights $w_n$ based on noise, and also based on local point density, it will often be desirable to do both, such as by combining them:

$$w_n = w_n^{(noise)} \times w_n^{(local\ density)}$$

Additionally, it may be useful to describe what set of points were seen in calibration, so if an abnormal material is seen in practice, one can tell that it didn't fall within the range of calibrated materials. To do so, we can calculate the hull (i.e. the boundary) of the points used in calibration.

Generally, this involves calculating both an AB hull (in the A-B plane) and a C hull (the range of calibrated locations). For the C hull, one might, for example, record the minimum and maximum value of C that was available during calibration. For the AB hull, one approach is to describe the hull by a list of coordinates of points on the hull boundary—that is, by a list of points $(A_k, B_k)$ for k=1 to $N_{hull}$. Then the full hull can be found by connecting all those points, such as with straight lines to form a polygon, or by connecting them with a higher order spline to form a smooth boundary. The polygon version can lend itself to faster processing.

The list of (A,B) hull points can be found using a-priori knowledge, such as by calculating the range of values for which calibration is expected to cover. Or these points might be found using some a-priori knowledge and some empirical measurements, such as deciding which (A,B) points to use based on knowledge from the phantom design, such as knowing what points correspond to minimum and maximum reasonable path lengths scanned during calibration, and then using the measured (A,B) values for those points to actually define the hull. Or one might use purely empirical knowledge, where one might measure the hull by tracing the boundary of all measured (A,B) points (perhaps after some outlier suppression). For example, one might use a general approach known in the art, such as active contours (also called "snakes" in the literature). Or when the desired (A,B) hull is convex (or nearly so), the list of (A,B) hull points can be found by taking the convex hull of all measured (A,B) points using, for example, prior art techniques such as those offered by the National Science and Technology Research Center for Computation and Visualization of Geometric Structures at the University of Minnesota via their qhull code (after discarding outliers via, for example, using the database-styled filtering mentioned above). In some cases, it may be preferable to use simpler hull-finding methods (such as those for convex sets), and so it may be desirable to choose warping functions that are likely to give (A,B) pairs that form a convex set (or a set that is close to convex). Many otherwise reasonable choices of A and B warpings do not accomplish this.

One may therefore choose a very specialized set of A and B warpings to encourage (A,B) to form a convex set, such as one of the A warpings given earlier, and $$B(H, L) = \left| -\log L + \sum_{k=0}^{PolyOrder} a_k (-\log H)^k \right|^\xi \times \text{sign}\left( -\log L + \sum_{k=0}^{PolyOrder} a_k (-\log H)^k \right),$$

where $\xi$ is a user parameter (a reasonable value might be around 0.25 to 0.5). Or one might instead (or in addition) use a method that begins by finding the convex hull then modifies it to fit tighter to the data. For instance, one can first calculate the convex hull, then sample each edge of the polygon (for example, by generating 10 new samples along each line segment). Then one can form a new list of hull points by stepping through the original points and each of the new points, and for each, finding the point in the original (A,B) data set that is closest to the convex hull point. This new set of points can then be used as a tighter hull than the convex hull. This tighter hull, in turn, can be thinned out by discarding hull points that are nearby other hull points.

An alternative way to find a tight hull is to employ so-called snakes, a hull-finding method (sometimes referred to as a boundary-finding method) known in the art that iteratively searches for the boundary that has the optimal compromise between snake energy (less bending (i.e. adaptation) is better) versus the distance between the hull and the nearest data points (smaller distance (and hence more adaptation) being better).

The various calibration options, such as material-number-type, point filtering, warping functions, fitting bases type, bases order, bases product-mode, noise weighting, density weighting, hull-finding method, and/or associated parameters could be hard-coded by the manufacturer, or user-selectable, or some combination of the two.

It should be noted that the calibration process described above is not limited to the particular examples and points of specificity that were provided in these various examples. For example, for more than two detected spectra, there may be additional warping functions beyond just A,B (and C). Usually, there will be one such input warping function per detected spectrum. In addition, the Y function might then depend on those additional warping functions. Furthermore, the Y function might have other inputs such as one or more inputs from a beam-quality detector, temperature sensor, or other such inputs. The above discussions on warping functions, model functions, fitting bases, table-interpolation methods, fitting methods, noise weighting, density weighting, and hull finding can all be extended to address the cases when Y has additional inputs (whether from additional spectra and/or from additional types of data).

At the end of calibration, any options or parameters that are not hard-coded (and even those that are) can be embedded in an output table along with the calibration output (the fitting coefficients, including the hull description) for use in the inspection software. By one approach, this table is placed on the scanner's computer so that the scanner directly produces material-number images. By another approach, this calibration table is placed on the viewer's computer and the viewer infers the material-number images from the radiographic images produced by the scanner. By another approach (similar to the second approach), the scanner embeds the calibration table in each image it produces to mitigate any risk that the images and table are mismatched, then the viewer calculates the material-number image.

By yet another approach, the scanner produces the material-number images but that image is still embedded with the calibration table so that the viewer can re-calculate the material image with slightly different parameters (or after further preprocessing the radiographic data) if desired. By another approach, one of the above approaches is used with multiple calibration tables tailored to different types of objects or different inspection goals. For example, one table may be suitable for a particular category of shipped materials (such as organic content) while another table may be more suitable for use with a different category of shipped materials (such as non-organic content). By another approach, when there are multiple ambiguous outcomes, one of the above approaches is used with multiple calibration tables, one for each set of outcomes. By another approach, one of the above approaches is used with multiple calibration tables, one producing a value for each desired order of material descriptor. By another approach, one of the above approaches is used with multiple calibration tables, one to generate values for the material descriptors themselves, and one to generate values to describe the strength of the noise that will be present in the material descriptor output values.

Image Generation

Material image generation can be performed as follows (assuming the above calibration has already been performed). For the dual-spectra example, the scanner produces two sets of data, H(ch,view)

L(ch,view)

where the two are spatially registered. These generally will have undergone standard preprocessing (such as correcting for source fluctuations and electronic offsets and gains, and so forth), and optionally, these may be further pre-processed, such as by applying a smoothing filter or binning data to reduce noise. Then for each pixel, calculate A(ch,view), B(ch,view), and C(ch,view) using the same warping functions used during calibration. Then feed these values into the Y function (using the calibrated coefficients) to produce a set of values Y(ch,view). Depending on the end application, Y might be fed directly into a colorization method, or might be fed directly into a threat detection algorithm, or Y might be transformed into an absolute scale such as $Z_{eff}$, $Z_{avg}$, class number (K), and so forth using (Y,Z) or (Y,K) pairs provided by the user or determined during calibration.

By one approach, one would be able to differentiate high-Z objects from low-Z objects using just this material image. The Z-image could directly contain estimated atomic numbers, or it could contain other measures such as the ratio of the high-to-low energy reading, or the ratio of high-to-low energy n-th value mass layer. Without loss of generality, these image values (whether atomic numbers, ratio values, or something else) are referred to herein as Z values.

Often, the Z values may be noisy, especially for megavolt scanners. Therefore, one might desire to smooth out the Z values. One might also seek to measure a level of confidence for each Z value that is calculated. For example, one can calculate noise using Taylor series approximations, similar as to what was described in the noise-weighting method described above for calibration. One can measure $\sigma_H^{air}$ and $\sigma_L^{air}$, the standard deviations typically seen through air, perhaps as part of the normal air-scan calibration process. Then the noise in each input image can be estimated using $\sigma_H \approx \sigma_H^{air}\sqrt{H}$ and $\sigma_L \approx \sigma_L^{air}\sqrt{L}$ If the images are optionally preprocessed by a smoothing operation, one can then adjust $\sigma_H$ and $\sigma_L$ by the expected effect of the operation (such as, for linear filtering, dividing by the square-root of the sum of the squares of the filter weights). These can then be used to estimate the noise in the output of the warping functions, $$\sigma_A \approx \sqrt{\sigma_H^2 \left|\frac{\partial}{\partial H}A\right|^2 + \sigma_L^2 \left|\frac{\partial}{\partial L}A\right|^2}$$

and $$\sigma_B \approx \sqrt{\sigma_H^2 \left|\frac{\partial}{\partial H}B\right|^2 + \sigma_L^2 \left|\frac{\partial}{\partial L}B\right|^2}$$

and those, in turn, can be used to determine the noise in the output of the material function $$\sigma_Y = \sqrt{\sigma_A^2 \left|\frac{\partial}{\partial A}Y(A,B,C)\right|^2 + \sigma_B^2 \left|\frac{\partial}{\partial B}Y(A,B,C)\right|^2}$$

If desired, that noise estimate can then be used to estimate the noise in Z, $$\sigma_Z(n) = \sigma_Y(n) \left|\frac{\partial}{\partial Y}Z(Y)\right|.$$

By one approach, the steps may be performed exactly as above, such as by calculating $\sigma_H$ and $\sigma_L$, then using those to calculate $\sigma_A$ and $\sigma_B$, then using those to calculate $\sigma_Y$, and optionally using that to calculate $\sigma_Z$. By another approach, some of the above equations can be combined analytically (especially if the warping functions and/or basis functions are known ahead of time), to improve computational performance. These two approaches are useful in that they allow a noise estimate to be derived directly from a given calibration table without any extra information or any extra effort during calibration.

Alternatively, the above steps may be performed during calibration to calculate the noise for some set of (H,L) pairs of interest. By one approach, the set of potential (H,L) pairs of interest is the set of (H,L) pairs seen during calibration, and one calculates $\sigma_Z$ for all of the data points used in calibration, then fits a model for $\sigma_Z$ using similar techniques to what was described for fitting a model for Z. In this approach, there are multiple sets of calibration coefficients (or multiple calibration tables), one for modeling Z, and one for modeling $\sigma_Z$. By another approach, the set of potential (H,L) pairs is relatively unrelated to the pairs seen during calibration, and one chooses, for example, a regular grid of (H,L) pairs. By another approach, one can model $\sigma_Z$ by fitting to some warpings of (H,L). For example, one can model $\sigma_Z$ as a function of (A,B), or as a function of (A,B,C). This last approach has the advantage of re-using (A,B,C) which can save computations if they are calculated during the calculation of Z anyway.

By another approach, one may fit a model for $\sigma_Z$ that is determined in whole or in part by some method other than the approximation method described above. For example, the model might be as described above but modified to increase $\sigma_Z$ for data points that are known a priori to suffer from ambiguities due to the physics of the scanning process.

To address noise, one might desire to smooth out the Z values. This could be done with standard filters such as linear filtering or median filtering, or by more sophisticated edge-preserving smoothing approaches. When $\sigma_Z$ has been calculated, it is generally desirable to, when smoothing Z, adjust $\sigma_Z$ to indicate the effect of smoothing.

For example, when applying linear filtering with some filter kernel h, $$Z_{out}(i,j) = \sum_{m,n} h(m,n) Z_{in}(i+m, j+n)$$

one may choose to divide $\sigma_Z$ by the square-root of the sum of the squares of the filter weights, $$\sigma_{Zout}(i,j) = \sqrt{\sum_{m,n} h^2(m,n) \sigma_{Zin}^2(i+m, j+n)}$$

For the simple case of an N×N moving-average filter, the above example becomes $$\sigma_{Zout}(i,j) = \frac{1}{N}\sqrt{\sum_{m,n} \sigma_{Zin}^2(i+m, j+n)}$$

One might also choose to take into account the measured variation of the Z values that are being smoothed together. For example, one might choose to process $\sigma_Z$ such that smoothing together similar values of Z decreases $\sigma_Z$, but smoothing together wildly different values of Z can actually increase $\sigma_Z$. For example (again for linear filtering), one might choose $$\sigma_{Zout}(i,j) = \sqrt{\sum_{m,n} h^2(m,n)[\sigma_{Zin}^2(i+m,j+n) + \alpha(Z_{in}(i+m,j+n) - Z_{out}(i+m,j+n))^2]}$$

where α is an optional weighting parameter. While the examples given here are for linear filters, one may similarly adjust the values of $\sigma_Z$ to account for the effect of other operations, including non-linear smoothing (such as median filters), edge-preserving smoothing, non-smoothing operations such as edge-enhancement, or any other reasonable processing operation.

If the noise in the original Z values is excessive, it can be very difficult to recover any useful Z values—if one does not apply enough smoothing, the values may still be too noisy to be useful, and if one applies too much smoothing, Z values from neighboring objects can bleed into each other. The latter not only destroys spatial information (that is, the object boundaries are ruined) but also makes Z inaccurate if the neighboring materials have different Z values.

One particular style of edge-preserving filtering makes use of approaches that employ explicit edge-detection, which generally work either by identifying object boundaries in the projection data, then smoothing the projection data so that the smoothing does not cross object boundaries, then calculating Z for these smoothed regions, or by calculating Z on a per-pixel basis, then finding edges in the Z image, then smoothing the Z data so that the smoothing does not cross the object boundaries, or by some combination of these two approaches.

For example, one can perform standard edge-detection or boundary detection techniques as known in the art, including localized methods (for example, the Canny method, Marr-Hildreth algorithm, Lindeberg's method, or modifications of these), or global methods (including active contours). These can give binary edge results (resulting in a hard segmentation) or one can modify these to give soft outputs (such that they produce smaller numbers when there is probably no edge and larger numbers when there probably is an edge). One can then perform smoothing in a way that tends not to cross these edge boundaries, for example, using normalized convolution, recursive filtering, or steerable filters. Many such methods can still be expressed as a linear filtering, such as $$Z_{out}(i,j) = \sum_{m,n} h(i,j,m,n) Z_{in}(i+m,j+n)$$

where now the filtering weights h are adjusted on a per-pixel basis to preserve edges. In such a case, one might choose to process $\sigma_Z$ in a similar method to linear filtering, but now using the new filter weights, for example using the following:

$$\sigma_{Zout}(i,j) = \sqrt{\sum_{m,n} h^2(i,j,m,n)[\sigma_{Zin}^2(i+m,j+n) + \alpha(Z_{in}(i+m,j+n) - Z_{out}(i+m,j+n))^2]}$$

While these approaches can work well for low to moderate noise levels, high noise levels can cause the edge detection to fail.

Alternatively, one can employ a method whereby edge detection (or preservation) is performed implicitly as part of the smoothing process. The general approach of our method is to find the Z image that both well-matches the measured data (H,L) and is fairly homogenous, spatially. To accomplish these goals, one can respectively define several cost functions:

$D(X,\Omega)$ the mismatch function, smallest when all the $X_k$ and $\Omega_m$ are consistent with each other;

$r_m(\Omega_m)$ the roughness function, the smoother the $\Omega_m$ image, the smaller its value.

These teachings will then accommodate and facilitate finding the image(s) $\Omega_m$ which minimize the above points of consideration—

$$\Omega^* = \underset{\Omega}{\operatorname{argmin}}\left[D(X,\Omega) + \sum_m r_m(\Omega_m)\right].$$

There are many suitable choices for each of a mismatch function, a misfit calibration strategy (to decide the coefficients in the mismatch function), a set of roughness functions, and/or a corresponding search method. Below are some choices for each. Those skilled in the art will recognize and understand that different combinations of the above are both possible and anticipated in a manner that is consistent with these teachings.

Mismatch Function

For a set of measurements and some set of Ω images, the mismatch function returns a small value when the measurements are consistent with the Ω images, and large when they are not. By one approach, the misfit function is the total raised error between the material numbers $\tilde{\Omega}$ predicted by the data measurements, and the Ω estimate, where $\tilde{\Omega}$ can be calculated using the predictor described earlier. For example, for dual spectra producing a single material-number estimate Z, then $\Omega=Z$, and $\tilde{\Omega}=\tilde{Y}$ can be found by $$\tilde{Y}_{i,j} = Y(A_{i,j}, B_{i,j}, C_{i,j}).$$

In this approach, the mismatch function can then be unweighted raised error, $$D(X,Z) = \sum_{i,j} |\tilde{Y}_{i,j} - Y_{i,j}|^p$$

where the preferred exponent is p=2, for mean-squared-error. Another option is a weighted raised error, $$D(X,Z) = \sum_{i,j} w_{i,j} |\tilde{Y}_{i,j} - Y_{i,j}|^p$$

where the weights can be determined, for example, by using noise estimates in a similar fashion as was prescribed for use during calibration. In many cases, it is desirable to calculate $\sigma_Z$ as described earlier and use those noise estimates to control the above weights.

When generating more than one descriptor (such as when generating both a common-mode value and material number value, or when generating 3 or more material descriptors), there will generally be a separate model function $Y_m$ for each descriptor, and so $\tilde{\Omega}$ is found by $$\tilde{\Omega}_{i,j,m} = Y_m(\text{warping}_1(X), \text{warping}_2(X), \ldots, \text{warping}_K(X), C_{i,j})$$

and mismatch can again be an unweighted raised error, $$D(X, Z) = \sum_m \sum_{i,j} |\tilde{\Omega}_{i,j,m} - \Omega_{i,j,m}|^p$$

or weighted raised error $$D(X, Z) = \sum_m \sum_{i,j} w_{i,j,m} |\tilde{\Omega}_{i,j,m} - \Omega_{i,j,m}|^p$$

or other reasonable choices, including applying appropriate warping functions to both $\tilde{\Omega}$ and $\Omega$ prior to calculating the raised error. Note that in general, any algorithm intended for use with weighted raised error can also be used with unweighted raised error, by setting all weights equal to 1.

Mismatch Calibration Strategy

For this approach, the mismatch calibration strategy can be the calibration method described earlier.

Roughness Function

A priori, one might expect Z to change minimally except at object boundaries. By one approach, then, one can therefore penalize images that do not fit this preconception. A roughness function r(Z) measures how far the Z image is from satisfying such a preconception. The function should generally return a large value for a noisy image and a small value for an image that is relatively smooth image, while not penalizing isolated large changes that may correspond to boundaries. As one example, one might assume that the image is made of piecewise homogenous materials, and Z should be close to piecewise constant. As another example, one might abandon the homogenous assumption and merely assume that Z should be piecewise smooth. When other orders of material descriptor are being generated, they may each be judged with separate roughness functions $r_m$. For example, one might assume that the material number Z should be nearly piecewise homogenous, but that the common mode image should merely be piecewise smooth.

Generally, minimizing roughness and minimizing misfit are opposing goals, so one may wish to compromise between the two. The misfit function can include a parameter $\lambda_m$ for each material descriptor—the larger it is, the more an image is encouraged to be smooth, and the smaller it is, the more $\Omega_m$ is encouraged to match the measured data ($\lambda$ can be thought of as a LaGrange multiplier that is embedded inside r). By one approach, the misfit function is chosen so that $\lambda_m$ is in units of pixels (or could be specified in mm) and can also be thought of as the spatial scale over which $\Omega_m$ must be smooth. While new to this application, many roughness penalties exist in the literature. Many roughness penalties fall under one of the following general forms, linear combination:

$$r(Z) = \sum_{i,j} \sum_{n=1}^{N_{kernels}} g(Z_{i,j} ** h_n)$$

quadrature combination:

$$r(Z) = \sum_{i,j} g\left(\sqrt{\sum_{n=1}^{N_{kernels}} (Z_{i,j} ** h_n)^2}\right)$$

where

"**" denotes two-dimensional convolution (as known in the art)

g is a penalty function (see below)

and $h_n$ is a directional derivative kernel.

For example, for a piecewise homogenous assumption, one may choose to penalize the first derivative. The preferred kernels to approximate first derivative are $$h_1 = [-1, 1] \text{ and } h_2 = \begin{bmatrix} -1 \\ 1 \end{bmatrix}.$$

Note that $Zh_1$ is then approximately the 1st derivative in the horizontal direction, and $Zh_1$ is then approximately the 1st derivative in the vertical direction.

As another example, for a piecewise smooth assumption, one may choose to penalize the second derivative. One way to do this is with a quadratic-variation model, using three kernels, $$h_1 = [1, -2, 1], h_2 = \begin{bmatrix} 1 \\ -2 \\ 1 \end{bmatrix}, \text{ and } h_3 = \begin{bmatrix} 0 & 0 & 0 \\ 2 & -2 & 0 \\ 0 & 2 & -2 \end{bmatrix}.$$

Another way to penalize second derivative is by penalizing the square Laplacian, using only one kernel $$h_1 = \begin{bmatrix} 0 & 1 & 0 \\ 1 & -4 & 1 \\ 0 & 1 & 0 \end{bmatrix}.$$

Some suitable g choices available in the literature are shown in Table 1 below. Additional choices also exist, most notably Gaussian Markov random field models, or generalized Gaussian Markov random field models (GGMRF), and functions proposed by Lange.

TABLE 1

| Name | g(t) | c |
|---|---|---|
| total variation | $\lambda \|t\|$ | n/a |
| quadratic | $\lambda^2 t^2$ | n/a |
| broken quadratic [Blake and Zisserman] | $\begin{cases} \lambda^2 t^2, & \text{when}\|t\| \le c \\ \lambda^2 c^2, & \text{when}\|t\| \ge c \end{cases}$ | $\frac{s}{\lambda}\sqrt{2}$ |

TABLE 1-continued

| Name | g(t) | c |
|---|---|---|
| Huber | $\begin{cases} \lambda^2 t^2, & \text{when}|t| \leq c \\ \lambda^2 c(2|t| - c), & \text{when}|t| \geq c \end{cases}$ | $\frac{s}{\lambda^2}$ |
| Geman & McClure | $\dfrac{\lambda^2 t^2}{1 + \left(\frac{t}{c}\right)^2}$ | |
| Hebert | $\lambda^2 c^2 \log\left(1 + \left(\frac{t}{c}\right)^2\right)$ | |
| Charbonnier | $2\lambda^2 c^2 \left(\sqrt{1 + \left(\frac{t}{c}\right)^2} - 1\right)$ | |
| Green | $2\lambda^2 c^2 \log\left(\cosh\left(\frac{t}{c}\right)\right)$ | |

The parameter c is calculated as shown in the table, where s corresponds to a threshold on edge strength. Viewed generally, jumps in pixel value smaller than this value will be treated as noise and smoothed out while steps larger than this value will be treated as legitimate edges and thus preserved. Preferably, the weight λ should be obtained (directly or indirectly) from a value expressed in units convenient to an end user, such as mm or pixels. Similarly, the value s (or c) should be obtained (directly or indirectly) from a value expressed in units convenient to an end user, such as a material resolution (when measuring roughness of Z) or a density resolution (when measuring roughness of the common mode image).

In general, some g functions may allow more efficient and reliable searching than do other g functions (see search methods discussed below). In particular, local optima can be significantly mitigated by choosing a g function that is convex, such as the Huber, Green, or Charbonnier penalty, or the Generalized Gaussian Markov Random Field (GGMRF) model. These also tend to be fairly robust to isolated noise spikes. For many search algorithms, any of these g functions can work well, in which case the Huber penalty may be the fastest and simplest. However, some other search algorithms may require a continuous first derivative and/or a non-zero second derivative, in which case the Green function, Charbonnier function, or GMMRF approach may be a better choice.

When using multiple material descriptor orders, it may be desirable to use different choices of g function for each descriptor, including different choices of parameters of g (such as λ, c, or s), and it may also be desirable to use different choices of combination mode or $h_{deriv}$ for each.

Searching Method

The total cost of some material descriptors estimate Ω is $$C(\Omega) = D(X, \Omega) + \sum_m r_m(\Omega_m)$$

These teachings will accommodate finding the Ω image(s) by searching for the images that minimize the above cost. For most non-trivial roughness measures other than the quadratic function, this will typically involve an iterative search rather than a one-step calculation. For any mismatch function D that can be written a sum of the contributions of each material description order, $$D(X, \Omega) = \sum_m D_m(X, \Omega_m),$$

such as weighted raised error where $$D_m(X, \Omega_m) = \sum_{i,j} w_{i,j,m} (\tilde{\Omega}_{i,j,m} - \Omega_{i,j,m})^p,$$

Then each descriptor image can be found independently by searching for $$\Omega_m^* = \operatorname*{argmin}_{\Omega_m} C_m(\Omega_m)$$

where $$C_m(\Omega_m) = D_m(X, \Omega_m) + r_m(\Omega_m)$$

Therefore, the following discussion describes methods to search for the Z image that minimizes C(Z), but the same methods can also be used for any order material descriptor.

There are many general-purpose search algorithms available in the literature that could be applied to this problem, including coordinate descent, steepest descent, Newton-Raphson, conjugate gradients, Gauss-Siedel iterations, quasi-Newton methods (such as the Broyden-Fletcher-Goldfarb-Shanno algorithm), the E-M algorithm, parabolic surrogates, or (disregarding computation requirements) the Nelder-Mead simplex algorithm or Hooke-Jeeves pattern search. All such algorithms that converge to the global optimum should converge to the same answer (within a small numerical tolerance), so one algorithm cannot in general be viewed as being more accurate than another. Their primary differences are just in speed to convergence, and whether or not they converge to the global optimum. Thus there is a wide selection of off-the shelf algorithms suitable for this application that vary only in their speed and computational requirements but not in their accuracy. Many (including all but the last two of the above) require an expression of the gradient of the cost function, which can allow much faster convergence than methods that can only evaluate the cost function. Some of them further require either a Hessian or some other list of second derivatives (or approximations to them). If desired, in at least some cases it may be possible to eliminate the gradient or second-derivatives numerically.

The gradient of the cost function is:

$$\frac{d}{dZ_{i,j}} C(Z) = \frac{d}{dZ_{i,j}} r(Z) + \frac{d}{dZ_{i,j}} D(X, Z)$$

Conveniently, the gradient of the roughness function can be found by
when r uses linear combining, $$\frac{d}{dZ_{ij}} r(Z) = \sum_n (g'(Z^{} h_n))^{} \tilde{h}_n$$

when r uses quadrature combining, $$\frac{d}{dZ_{ij}} r(Z) = \sum_n \left[ \left( \frac{g'\left(\sqrt{\sum_n (Z^{}h_n)^2}\right) \times (Z^{}h_n)}{\sqrt{\sum_n (Z^{}h_n)^2}} \right)^{} \tilde{h}_n \right]$$

where $\tilde{h}_n$ is a symmetrically-flipped copy of $h_n$. Similarly, the 2nd derivatives of the roughness function can be found analytically. When r uses linear combining, then $$\frac{d^2}{dZ_{i,j}^2} r(Z) = \sum_n (g''(Z^{}h_n)^{}(\tilde{h}_n^2))$$

One can perform straightforward differentiation to find the functions g' (the derivative of g), g" (the second derivative of g), as well as the gradient of the mismatch function. For example, for the Huber function, $$g'(t) = \begin{cases} 2\lambda^2 t, & \text{when } |t| \leq c \\ 2\lambda^2 c \times \text{sign}(t), & \text{when } |t| \geq c \end{cases}$$

and $$g''(t) = \begin{cases} 2\lambda^2, & \text{when } |t| \leq c \\ 0, & \text{when } |t| \geq c. \end{cases}$$

For a weighted raised-error mismatch function, $$\frac{d}{dZ_{i,j}} D_m(X, Z) = p \sum_{i,j} w_{i,j,m} |\tilde{Y}_{i,j,m} - Y_{i,j,m}|^{p-1} \times \text{sign}(\tilde{Y}_{i,j,m} - Y_{i,j,m}) \times \frac{d}{dZ_{i,j}} Y_{i,j,m}$$

where $$\frac{d}{dZ_{i,j}} Y_{i,j,m}$$

is the derivative of the Y-to-Z warping, or 1 if there is no such warping.

Once the appropriate gradients (and optional 2nd derivatives) are available, one can employ any number of off-the-shelf search algorithms as known in the art. For example, one can employ adaptive gradient descent using this computed gradient, $$Z_{i,j}^{next} = Z_{i,j}^{previous} - \varepsilon \times \frac{d}{dZ_{i,j}} C(Z^{previous})$$

where the step size $\varepsilon$ is adaptively adjusted to ensure that no update of Z ever increases C(Z). The above is repeated until a stable image is found. Other alternatives, including conjugate gradient search (with our without preconditioning with the second derivatives), or the limited-memory Broyden-Fletcher-Goldfarb-Shanno algorithm may also be used, as are known in the art.

Weak Membranes

The use of regularization (via, for example, roughness functions, smoothness priors, penalty functions, or the like) is known but is often eschewed due to its perceived computational requirements (at least as compared, for example, to alternative processes such as least squares fitting). Notwithstanding this general perception, the applicant has determined that regularization may be useful for post filtering purposes (or as part of the image generation activity itself) in at least some application settings.

A regularization-based approach allows the fit to follow the data. If one imagines a piece of stretchy elastic being pulled towards each data point by a spring, the elastic is pulled towards the points by the springs but also resists because its elasticity constant prevents it from stretch to far. Generally speaking, a stiffer piece of elastic results in more smoothed data, whereas a less stiff piece of elastic is dominated by the springs at each data point and therefore more closely follows the data itself (and so the elastic has little effect). In this interpretation, the roughness function is analogous to the energy in an imaginary elastic membrane, and the parameter $\lambda$ can be interpreted as describing the elastic stiffness. For example, the "quadratic" function of Table 1 describes an elastic membrane with stiffness $\lambda$.

In some cases, no particular attempted membrane fits a given data set especially well. With a weak membrane, the metaphorical elastic can only be stretched so much, then it becomes inelastic, either by (again, metaphorically) undergoing plastic deformation, or by breaking (i.e. fracturing). In this interpretation, the parameter s of the roughness function describes the strength (or elastic limit) of the elastic membrane. At places other than discontinuities, the stiffness controls how closely the membrane is allowed to follow the original data points.

For example, in the roughness functions from Table 1, the "broken quadratic" describes a weak membrane that breaks after a discontinuity of strength s, whereas the Huber function describes a weak membrane that plastically deforms after a discontinuity of strength s, and both membranes have stiffness $\lambda$. Other roughness functions (such as the last several from Table 1) only loosely (rather than explicitly) correspond to a weak membrane model. The choice of "optimal" stiffness is generally problem-specific, and the stiffness parameter $\lambda$ is either left as a user parameter, or it may be derived from some other user parameter (such as the minimum dimensions of a feature to be detected) and/or from some measured system parameter(s) (such as noise levels). Similarly, the choice of optimal strength parameter (for those roughness functions that use one) is also problem-specific, and can be left as a user parameter or can be derived from other user parameters (such as desired Z resolution) or system measurements.

Implementing a Weak Membrane

The following sections contain equations for a weak membrane, a detailed algorithm for implementing the search, and some example images.

Say that we have a measured image $X_{i,j}$ and want to find the weak membrane fit, $Y_{ij}$. We do so by searching for the $Y_{ij}$ that jointly minimizes three costs, based on:
  a) the difference between $Y_{ij}$ and $X_{ij}$
  b) any bending in $Y_{ij}$ (within the elastic limit), penalized according to stiffness parameter
  c) any stretching of the membrane beyond the elastic limit, according to the strength parameter (and/or, perhaps in some cases, a stiffness parameter).

Thus the total cost is $$F = \sum_i \sum_j |Y_{i,j} - X_{i,j}|^2 + \lambda \sum_i \sum_j \|\nabla Y_{i,j}\|^2 + \alpha \sum_i \sum_j s_{i,j}$$

where the terms correspond in order to (a)-(c) above.
$\nabla Y$ is the gradient of Y, or some discrete approximation
$s_{i,j}$ is the inelastic component of the energy in the membrane at pixel (i,j), where s=0 if the membrane is in its elastic region, and s is either an increasing function of $|\nabla Y|$ for a plastically deformable membrane, or a constant (such as 1) for a broken membrane.
$\lambda$ is the stiffness parameter
$\alpha$ is the strength parameter For a variety of different choices of discrete approximations to the gradient, and for a variety of different choices for the type of inelastic membrane behavior, the above energy function can be written as one of the following:

$$F = \sum_i \sum_j |Y_{i,j} - X_{i,j}|^2 + \sum_i \sum_j [g(\sqrt{\|(\nabla Y_{i,j})(\nabla Y_{i,j})^T\|})]$$

$$F = \sum_i \sum_j |Y_{i,j} - X_{i,j}|^2 + \sum_i \sum_j [g(\|(\nabla Y_{i,j})\|)]$$

$$F = \sum_i \sum_j |Y_{i,j} - X_{i,j}|^2 + \sum_i \sum_j \left[g\left(\frac{d}{dx}Y_{i,j}\right) + g\left(\frac{d}{dy}Y_{i,j}\right)\right]$$

where the first version (see Blake and Zisserman) follows directly from the physical membrane model (here $\|\cdot\|$ denotes matrix norm), the second is an approximation that can improve computational efficiency (here $\|\cdot\|$ denotes vector norm), and the third is another approximation that can even further improve computational efficiency. The third can have the downside of treating horizontal and vertical edges different than some diagonal edges, but the computational advantages often outweigh this disadvantage. For this computational reason, the third approach may be favored for many application settings.

The function g(t) combines the effect of both the elastic and inelastic terms (i.e. both the gradient term and the s term above). These forms have two main advantages over the three-component membrane model. First, they allow some g functions that are not easily expressible using the three energy terms, since one can now design new g functions without the need for a physical membrane interpretation. For example, in the methods of Table 1, for the quadratic, broken quadratic, and Huber energy functions it is straightforward to write the cost either as a three-component membrane model or by using g functions, but for the remainder of the methods in Table 1, it is much less cumbersome to describe cost with g functions. The second, and perhaps more important reason to use g functions is that it can be more computationally efficient to search only for Y than to search for both Y and s. With the g forms, the s term disappears, simplifying the search algorithm. Even though s no longer appears in the equation, it can still be recovered from the final answer for Y if desired. For example, in the broken quadratic method or in the Huber method, s is non-zero when $|t| \geq c$. For material discrimination, the s values can be useful for threat detection since s is typically zero within a single material and non-zero along the boundary of the object. Essentially, s gives us the boundary of the object. Note that while prior art often performs a segmentation explicitly, we find s implicitly as part of the smoothing process. One can obtain $\nabla Y$ by a discrete convolution with a 2D kernel h, so $$\frac{dY}{dx} = Y * h \text{ and } \frac{dY}{dy} = Y * h^t$$

where $^t$ is the transpose operator, and the most common kernel is $$h = [0, \underline{1}, -1] \text{ and } h^t = \begin{bmatrix} 0 \\ \underline{1} \\ -1 \end{bmatrix}$$

Thus, one can rewrite cost as $$F = \sum_i \sum_j |Y_{i,j} - X_{i,j}|^2 + \sum_i \sum_j [g(Y^x_{i,j}) + g(Y^y_{i,j})]$$

where $$Y^x = Y * h \text{ and } Y^y = Y * h^t$$

(note that the superscripts $^x$ and $^y$ are just labels, not exponents).

The goal is to find Y to minimize F. This can be done through gradient descent, since $$\frac{dF}{dY_{i,j}} = 2(Y_{i,j} - X_{i,j}) + g'(Y^x_{i,j}) * \tilde{h} + g'(Y^y_{i,j}) * \tilde{h}^t$$

where $\tilde{h}$ is the converse filter, made by flipping the original. For example,
for h=[0,1,−1] then $\tilde{h}$=[−1,1,0]
and g' is the derivative of the g function.

For each function in Table 1, it is straightforward to analytically write out this derivative. For example, for the Huber function, $$g'(t) = \begin{cases} 2\lambda^2 t, & \text{when } |t| \leq c \\ 2\lambda^2 c \times \text{sign}(t), & \text{when } |t| \geq c \end{cases}$$

Having analytic calculations for both F and $$\frac{dF}{dY_{i,j}},$$

one can readily perform an iterative search for the Y image that minimizes F using any off-the-shelf gradient-based method, including (but certainly not limited to) gradient descent, conjugate gradients, the Levenberg-Marquardt algorithm, the Gauss-Newton algorithm, or parabolic surrogates. There are many general-purpose software packages (often called "solvers") available (both free and commercial) that can be directly applied to this minimization. Note that many of these methods will work from an arbitrary initialization (for example, a first estimate could be that Y is random noise, or all zeros), but a good initialization can make the algorithm much faster and more reliable—conveniently, one can use the aforementioned original prediction $\tilde{Y}$ as the initial estimate for Y.

For illustrative purposes, a gradient descent approach will now be described. One can find the best image $Y_{ij}$ by repeatedly performing $$Y_{i,j}^{(n+1)} = Y_{i,j}^{(n)} - \omega \times \frac{dF}{dY_{i,j}}$$

The choice of optimal step size $\omega$ is commonly addressed in the public literature. If $\omega$ is sufficiently small, the algorithm is guaranteed to converge, but if it is very small the algorithm may be unacceptably slow. Worse, if $\omega$ is too large, the update may overshoot the optimal solution, causing the algorithm to become unstable, either wandering around the neighborhood of the solution without ever converging, or making perpetually worse guesses (overshooting by more and more each time). In the second case, the search algorithm can easily produce a catastrophically bad solution. If $\omega$ is too large but there is no catastrophic overshoot, then the algorithms will tend to fall into a limit cycle, where they oscillate jumping back and forth over the solution, never really getting any closer. Thus it is advantageous to try and use a $\omega$ value as big as possible without ruining stability.

While there exist theoretically optimal values of step size for quadratic problems, such results may not be directly applicable to the present problem, which is not quadratic (and in some cases, not even convex). Commonly, gradient descent is modified by introducing an adaptive step size. In our version of adaptive step size gradient descent, after each step, we try to increase $\omega$ by a small multiplicative factor, and if we notice that an update increases cost, we revert Y to our prior estimate, decrease $\omega$, and try again. This ensures that cost never increases in an uncontrolled manner and thus the algorithm is stable. It also tends to keep the step size as large as possible, which gives fast convergence.

The following algorithm is illustrative in these regards:

```
User inputs:
    α, λ
Algorithm inputs:                           (suggested)
    MaxIters                                300
    MaxLineSearchIters                      50
    h                                       [0, 1, −1]
    f_ω^growth                              1.2
    f_ω^shrink                              0.3
    ε                                       0.001 (depends on data range)
Initialization:
    Calculate the Ỹ image using the non-regularized material image generation
algorithm given earlier.
    Initialize Y = Ỹ
Perform convolutions:
    Y^x = Y * h
    Y^y = Y * h^t
Calculate initial cost:
```

$$F = \sum_i \sum_j |Y_{i,j} - \tilde{Y}_{i,j}|^2 + \sum_i \sum_j [g(Y_{i,j}^x) + g(Y_{i,j}^y)]$$

```
Set iter = 1
Set ω = large number
Set finished = false
Repeat:       // repeat until we've converged
Set F_old = F
Calculate step direction image
```

$$\frac{dF}{dY_{i,j}} = 2(Y_{i,j} - \tilde{Y}_{i,j}) + g'(Y_{i,j}^x) * \tilde{h} + g'(Y_{i,j}^y) * \tilde{h}^t \quad \text{for all i, j}$$

```
Set LineSearchIters = 0
Repeat:            // adjust step size until improvement is monotonic
    Calculate candidate image
```

$$Y_{i,j}^{test} = Y_{i,j} - \omega \times \frac{dF}{dY_{i,j}} \qquad \text{for all i, j}$$

```
Perform convolutions:
    Y^x = Y^test * h
    Y^y = Y^test * h^t
Measure F:
```

$$F_{test} = \sum_i \sum_j |Y_{i,j}^{test} - \tilde{Y}_{i,j}|^2 + \sum_i \sum_j [g(Y_{i,j}^x) + g(Y_{i,j}^y)]$$

```
Set LineSearchIters = LineSearchIters + 1
If (F_test ≥ F_old) then
    Set ω = f_ω^shrink × ω       // old step size was too big, let's shrink
EndIf
Until (F_test < F_old) or (LineSearchIters ≥ MaxLineSearchIters)   // done ω search
```

-continued

```
Set ω = f_ω^grow × ω        // let's try increasing the step size a little
If F_test < F_old then      // search is good
    Set F = F_old Set MaxChange = max_{i,j} |Y_{i,j} − Y_{i,j}^{test}|

If (MaxChange ≤ ε) then
        Set finished = true
        Set Y_{i,j} = Y_{i,j}^{test}        for all i, j
    EndIf
EndIf
Set iter = iter + 1
If iter ≥ MaxIters then
    set finished = true
EndIf
Until finished // done converging
```

It should be noted that the adaptive gradient descent method given above is merely one choice of optimization (aka search) algorithm. Other methods might be more appropriate for different choices of roughness function, mismatch function, computing hardware, and so forth. Some optimization methods (aka search methods) are more appropriate for some types of cost function than others. Many methods (including gradient descent) are fast but only likely to converge (often, guaranteed to converge) to the proper solution when the cost function is known to be convex. For example, of the methods in Table 1, the broken quadratic, Hebert, and Geman functions are all non-convex. The quadratic, Huber, Charbonnier, and Green functions are all convex. Thus, one can expect a fast and stable search with one of these latter four methods. The above algorithm is suitable for any of these cost functions. With the non-convex cost functions, searching generally requires special steps to find the global optimum, which are often quite slow.

One solution for non-convex cost functions is called Graduated Non-Convexity (GNC). The idea behind GNC is to take a non-convex cost function with many local optima, and to change it to a similar easy-to-optimize convex function. We perform our iterative search on this convex cost, but as we progress through the iterations, we gradually re-introduce the non-convexity, until we are ultimately left with something that optimizes our original cost function.

For weak membranes, this can be accomplished by introducing a p parameter. For the broken quadratic function, we roll off the g function using $$g_p(t) = \begin{cases} \lambda^2 t, & \text{if } |t| < T_1 \\ \alpha - \frac{c}{2}(|t| - T_2)^2 & \text{if } T_1 \leq |t| < T_2 \\ \alpha, & \text{if } |t| \geq T_2 \end{cases}$$

where $$c = \frac{1}{4p}$$

$$T_2 = \sqrt{\alpha \times \left(8p + \frac{1}{\lambda^2}\right)}$$

$$T_1 = \frac{\alpha}{\lambda^2 \times T2}$$

Note that in the limit as p→0, this cost function is the same as the broken quadratic. However, for p=1, the cost function F is at least approximately convex (though g is still not) and is much easier to optimize than for p=0. For higher p, the function is more smooth, and easier to optimize, whereas for p=0 it has a discontinuous first derivative. So to perform GNC, we will first find a solution for p=1, then update our solution while steadily decreasing p. It also seems that there is no benefit to updating in the region $$p \leq \frac{1}{2\lambda}$$

—once this value of p is reached, further updates don't change the solution.

The following algorithm is illustrative in these regards:

```
User inputs:         (same as for convex algorithm)
Algorithm inputs:    (same as convex algorithm, and also:)
    f_p                  0.5
Overall Initialization:

Calculate Ỹ_{i,j} for all i, j, using the non-regularized material image
generation algorithm given earlier.
    Initialize Y = Ỹ
    Y^x = Y * h
    Y^y = Y * h^t F = ∑_i ∑_j |Y_{i,j} − Ỹ_{i,j}|² + ∑_i ∑_j [g_p(Y_{i,j}^x) + g_p(Y_{i,j}^y)]

p_min = 1/(2λ)

Set p = 1
Repeat      //loop through all p values
Perform the entire minimization routine given above for convex functions,
but with the following changes:
    Skip the initialization of Ỹ_{i,j}, Y, Y^x, Y^y, and F.
    Use g_p(t) as the roughness function
    Set p = f_p × p    // decrease p, introduce some more non-convexity
Until p ≤ (p_min × f_p)   // wait until we've already finished p ≤ p_min and
further decreased p)
```

In both the steepest descent algorithm and graduated non-convexity algorithms, the bulk of the computation time is spent performing convolution, evaluating g for each pixel, and evaluating g' for each pixel. Each of these time consuming operations are well suited to parallelization, and could be performed on various available hardware platforms such as the aforementioned processor. Using the ordered subsets approach (as known in the art), it may also be possible to update the pixels in-place, so that other pixels' updates are based on the most recent values of their neighbors. This can improve convergence speed, though perhaps at the risk of not converging.

$$f_k(\Omega, C, q) = \sum_{i_1} \sum_{i_2} \cdots \sum_{i_M} \sum_{j_0} \sum_{j_1} \cdots \sum_{j_Q}$$

$$\left[ c_{i_1,i_2,\ldots,i_M,j_0,j_1,\ldots,j_{N_q}} \times \phi_{i_1}^{(1)}(\Omega_0)\phi_{i_2}^{(2)}(\Omega_1) \cdots \phi_{i_M}^{(M)}(\Omega_{M-1})\phi_{j_0}^{(C)}(C)\phi_{j_1}^{(q_1)}(q_1) \ldots \phi_{j_Q}^{(q_Q)}(q_Q) \right]$$

By another approach, rather than a mismatch function that measures the difference between predicted Z values and a smoothed Z image (or more generally, between predicted $\Omega$ values and a smoothed $\Omega$ image), one can design (or possibly choose, where candidate selections are provided a priori) a mismatch function that measures the difference between predicted projection data (predicted using $\Omega$) and measured projection data. The following is a description of such an approach.

Mismatch Function

By one approach, the misfit function is found by warping the X data to obtain new variables P, then measuring the difference between measured and predicted values of P. For example, as was described in the non-regularized calibration approach, for dual-spectra one could choose $$P_1(H, L) = -\log(H)$$

and $$P_2(H, L) = -\log(L)$$

or $$P_1(H, L) = (-\log(H) - \log(L))/2$$

and $$P_2(H, L) = -\log L - \sum_{k=0}^{PolyOrder} a_k(-\log H)^k$$

where $a_k$ values are obtained through least squares fitting. It may be desirable, though it is not required, that these warpings are the same as those used in the non-regularized calibration. New warpings might also be desirable. For example, one might choose $$P_k(X) = -\log(X_k + \epsilon_k)$$

where $\epsilon_k$ is chosen (perhaps different for each detected spectrum) to prevent the argument to the logarithm from going negative, or to represent growing uncertainty as X approaches 0.

By one approach, a set of model functions $f_k(\Omega)$ is designed to predict the measurements $X_k$ from an estimate of the material descriptors. By another approach, the model functions take in additional parameters, such as channel number (or any of the location warpings described in the calibration procedure for the open-loop approach), beam-quality measurement values, displacement values, or the like. For the purposes of an illustrative example, let C be a warping of location, similar to as described in the open-loop calibration approach described earlier, and let $q_1 \ldots q_Q$ denote a set of measurements from a beam-quality detector. Then the function $f_k(\Omega,$ C, q) predicts a value of the $X_k$ image using this extra information.

The model functions can be designed in essence the same way as in the non-regularized calibration method given earlier. For example, one can assume that For the case of two spectra, two descriptors, and no channel information or beam quality information, this simplifies to $$f_k(\Omega, C, q) = \sum_i \sum_j c_{i,j} \phi_i^{(1)}(\Omega_0) \phi_j^{(2)}(Z)$$

where $\Omega_0$ is the common mode image, and $\phi$ are a set of fitting basis functions, as described earlier.

Then, for a set of measured or simulated points $X_{n,k}$, $\Omega_{n,m}$, $C_n$, and $q_{n,i}$, where
n=1 ... $N_{samples}$
k=1 ... K
m=1 ... M
i=1 ... Q,
calculate $P_{n,k}$ and search for the coefficients that minimize $$\sum_{n=1}^{M} \sum_{k=1}^{K} w_n |P_{n,k} - f_k(\Omega_n, C_n, q_n)|^p$$

where the preferred exponent is p=2, and the available options for bases $\phi$, weightings w, and so forth, are the same as described earlier, and points may be pre-filtered, also as described earlier. Note, however, that if this regularization approach is used in tandem with the non-regularized approach, two different sets of fitting coefficients result, one for each approach. Additionally, the user may make different choices for the point filtering, bases, table-interpolation choices, fitting orders, density weightings, noise weightings, and so forth for the two different approaches.

The predictor $f$ also include a hull description, as described earlier. The predictor can extrapolate outside the hull, for example by, when asked to evaluate a point outside the hull, evaluating a low-order Taylor series (perhaps even a zero'th order series) approximation of $f$ about the nearest point on the hull. As another example, especially for a table-interpolation approach, the model might be designed to give good extrapolated values to begin with, and the hull might be unnecessary.

Given a choice of warping functions and a predictor, the mismatch function can then be calculated as the difference between the measured and predicted values. Often, it is convenient to choose a mismatch function that is a sum of a separate mismatch for each detected spectrum, so $$D(X, \Omega) = \sum_k D_k(X_k, \Omega)$$

where $D_k$ is the mismatch for a single image, and the preferred choice is weighted raised error, $$D_k(X_k, \Omega) = \sum_{i,j} w_{i,j,k}|P_{i,j,k} - f_k(\Omega_{i,j}, C_i, q_j)|^p$$

where here, i indexes the in-plane position (such as, for example, a channel number), and j corresponds to the traversal position (such as, for example, a view number).

If desired, one could instead use an alternative measure of the distance between P and $f$, such as the maximum difference, sum of ratios, product of ratios, difference of logs, and so forth, but the above formula is computationally convenient and will likely comprise a preferred approach for many application settings. Choosing appropriate warping functions can often alleviate the need for such modified distance measures.

By another approach, the mismatch function could include a spatial term, such as $$D_k(X_k, \Omega) = \sum_k \sum_{i,j} w_{i,j,k} \sum_{m=-d}^{d} \sum_{n=-d}^{d} u_{m,n} \times |P_{i+m,j+n,k} - f_k(\Omega_{i,j}, C_i, q_j)|^p$$

where d is some neighborhood size (such as 2 or 7) and $u_{m,n}$ is some weighting function, such as uniform weighting, $$u_{m,n} = \frac{1}{(2d+1)^2} \text{ or } u_{m,n} = 1$$

or another other standard weighting choice that declines with distance, such as a Gaussian-inspired weighting, $$u_{m,n} = e^{-d^2/2}$$

or other similar choices such as a pyramid-shaped weighting.

By yet another approach, the spatial term could be non-linear, such as $$D_k(X_k, \Omega) = \sum_{i,j} w_{i,j} \underset{\substack{-d \leq m \leq d \\ -d \leq n \leq d}}{\text{median}} |P_{i+m,j+n,k} - f_k(\Omega_{i,j}, C_i, q_j)|^p$$

but this can complicate calculating a gradient, which is needed by many search algorithms. The linear spatial version, on the other hand, is straightforwardly extendible to support a derivative.

Roughness Function

The options for roughness function essentially include all those mentioned earlier. As was the case with the open-loop approach, many roughness functions will follow one of these general forms, linear combination:

$$r_m(\Omega_m) = \sum_{i,j} \sum_{n=1}^{N_{kernels}(m)} g_m(\Omega_{i,j,m} ** h_{n,m})$$

quadrature combination:

$$r_m(\Omega_m) = \sum_{i,j} g_m\left(\sqrt{\sum_{n=1}^{N_{kernels}(m)} (Z_{i,j} ** h_{n,m})^2}\right)$$

where the roughness functions might be chosen differently for each m, including the g function and/or its parameters, the set of derivative kernels, and/or the method of linear or quadrature combinations. A number of various roughness functions for regularization are known in the art.

Searching Algorithm

One can find the material descriptor images by searching for the $\Omega$ values that make the predicted values best match the measured values, using a roughness constraint on $\Omega$. This search algorithm will generally be iterative in nature, progressing through various estimates of $\Omega$ until one is found that minimizes the cost function $C(\Omega)$. An initial estimate of $\Omega$ can be, for example, all zeros, all ones, random values, an analytic function of the inputs (such as, to produce the common mode image, the average across k of $X_{i,j,k}$), a coarse brute-force search, or the image(s) produced by the open-loop predictor described earlier. This last choice can result in fast convergence, but will typically require extra computations to compute the initialization and extra calibration effort to produce two different predictors (a forward predictor and a reverse predictor); that said, the improvement in search speed is often considered well worth the effort in many application settings.

The total cost function for a given estimate of $\Omega$ is $$C(\Omega) = \sum_k D_k(X_k, \Omega_k) + \sum_m r_k(\Omega_k)$$

and its derivative is $$\frac{d}{d\Omega_{i,j,m}} C(\Omega) = \left(\sum_k \frac{d}{d\Omega_{i,j,m}} D_k(X_k, \Omega)\right) + \frac{d}{d\Omega_{i,j,m}} r_m(\Omega_m)$$

For the sake of an illustrative example, consider the preferred method where $D_k$ is weighted squared error, $$D_k(X_k, \Omega) = \sum_{i,j} w_{i,j,k}|P_{i,j,k} - f_k(\Omega_{i,j}, C_i, q_j)|^2$$

and $r_k$ is a set of roughness functions appropriate to the application setting. For the sake of an illustrative example, let us further consider $r_k$ to use the method of linear combination, so $$r_m(\Omega_m) = \sum_{i,j} \sum_{n=1}^{N_{kernels}(m)} g_m(\Omega_{i,j,m} ** h_{n,m}).$$

Then the derivative of cost can be written as $$\frac{d}{d\Omega_{i,j,m}} C(\Omega) = 2\sum_k \sum_{i,j} w_{i,j,k}(f_k(\Omega_{i,j} \cdot C_i, q_j) - P_{i,j,k})f'_{k,(m)}(\Omega_{i,j,m}, C_i, q_j) +$$

-continued $$\sum_{i,j} \sum_{n=1}^{N_{kernels}(m)} (g'_m(\Omega_m^{} h_n)^{} \tilde{h}_n)$$

and its second derivative is $$\frac{d^2}{d\Omega_{i,j,m}^2} C(\Omega) =$$

$$2\sum_k \sum_{i,j} w_{i,j,k} [(f_k(\Omega_{i,j}, C_i, q_j) - P_{i,j,k}) f''_{k,(m)}(\Omega_{i,j,m}, C_i, q_j) + (f'_{k,(m)}(\Omega_{i,j,m}, C_i, q_j))^2] +$$

$$\sum_{i,j} \sum_{n=1}^{N_{kernels}(m)} (g''_m(\Omega_m^{} h_n)^{} (\tilde{h}_n^2))$$

though sometimes (usually for performance reasons) this can be approximated by $$\frac{d^2}{d\Omega_{i,j,m}^2} C(\Omega) =$$

$$2\sum_k \sum_{i,j} w_{i,j,k} (f'_{k,(m)}(\Omega_{i,j,m}, C_i, q_j))^2 + \sum_{i,j} \sum_{n=1}^{N_{kernels}(m)} (g''(\Omega_m^{} h_n)^{} (\tilde{h}_n^2))$$

where the predictor derivatives are $$f'_{k,(m)}(\Omega_{i,j,m}, C_i, q_j) = \frac{d}{d\Omega_{i,j,m}} f_k(\Omega_{i,j}, C_i, q_j)$$

$$f''_{k,(m)}(\Omega_{i,j,m}, C_i, q_j) = \frac{d^2}{d\Omega_{i,j,m}^2} f_k(\Omega_{i,j}, C_i, q_j)$$

For example, when the predictor function is composed of separable bases (as described earlier), so $$f_k(\Omega, C, q) =$$

$$\sum_{i_1} \sum_{i_2} \cdots \sum_{i_M} \sum_{j_0} \sum_{j_1} \cdots \sum_{j_{N_q}} \left[ c_{i_1, i_2, \ldots, i_M, j_0, j_1, \ldots, j_{N_q}} \times \phi_{i_1}^{(1)}(\Omega_0) \phi_{i_2}^{(2)}(\Omega_1) \right.$$

$$\left. \cdots \phi_{i_M}^{(M)}(\Omega_{M-1}) \phi_{j_0}^{(C)}(C) \phi_{j_1}^{(q_1)}(q_1) \cdots \phi_{j_Q}^{(q_Q)}(q_Q) \right]$$

Then $$f'_{k,(m)}(\Omega_{i,j,m}, C_i, q_j) =$$

$$\sum_{i_1} \sum_{i_2} \cdots \sum_{i_M} \sum_{j_0} \sum_{j_1} \cdots \sum_{j_{N_q}} \left[ c_{i_1, i_2, \ldots, i_M, j_0, j_1, \ldots, j_{N_q}} \times \phi_{i_1}^{(1)}(\Omega_0) \right.$$

$$\left. \cdots \phi'^{(m)}_{i_m}(\Omega_m) \cdots \phi_{i_M}^{(M)}(\Omega_{M-1}) \phi_{j_0}^{(C)}(C) \phi_{j_1}^{(q_1)}(q_1) \cdots \phi_{j_Q}^{(q_Q)}(q_Q) \right]$$

and $$f''_{k,(m)}(\Omega_{i,j,m}, C_i, q_j) =$$

$$\sum_{i_1} \sum_{i_2} \cdots \sum_{i_M} \sum_{j_0} \sum_{j_1} \cdots \sum_{j_{N_q}} \left[ c_{i_1, i_2, \ldots, i_M, j_0, j_1, \ldots, j_{N_q}} \times \phi_{i_1}^{(1)}(\Omega_0) \right.$$

$$\left. \cdots \phi''^{(m)}_{i_m}(\Omega_m) \cdots \phi_{i_M}^{(M)}(\Omega_{M-1}) \phi_{j_0}^{(C)}(C) \phi_{j_1}^{(q_1)}(q_1) \cdots \phi_{j_Q}^{(q_Q)}(q_Q) \right]$$

where
$\phi'_{i_n}{}^{(n)}(x)$ is the first derivative of $\phi_{i_n}{}^{(n)}(x)$, and
$\phi''_{i_n}{}^{(n)}(x)$ is the second derivative of $\phi_{i_n}{}^{(n)}(x)$.
For example, for a polynomial basis, where
$\phi_{i_n}{}^{(n)}(x) = x^{i_n}$,
then $\phi'_{i_n}{}^{(n)}(x) = i_n x^{i_n - 1}$ and $\phi''_{i_n}{}^{(n)}(x) = i_n(i_n - 1) x^{i_n - 2}$ As another example, for a table-interpolation method, in theory the method can be written as above, but in practice it is usually implemented as follows:

$$f_k(\Omega) = \sum_{i_1 = -(O-1)}^{O} \sum_{i_2 = -(O-1)}^{O} \cdots$$

$$\sum_{i_M = -(O-1)}^{O} c_{b_1 + i_1, b_2 + i_2, \ldots, b_M + i_M} u_{i_1} \left( \frac{\Omega_1 - \overline{\Omega}_1(b_1)}{\overline{\Omega}_1(b_1 + 1) - \overline{\Omega}_1(b_1)} \right)$$

$$u_{i_2} \left( \frac{\Omega_2 - \overline{\Omega}_2(b_2)}{\overline{\Omega}_2(b_2 + 1) - \overline{\Omega}_2(b_2)} \right) \cdots u_{i_3} \left( \frac{\Omega_M - \overline{\Omega}_M(b)}{\overline{\Omega}_M(b_M + 1) - \overline{\Omega}} \right)$$

where
$\overline{\Omega}_m(i)$ is the $i^{th}$ node value for $\Omega_m$ (usually determined during calibration)
$b_m$ is the bin location, determined so that $\overline{\Omega}_m(b_m) \leq \Omega_m < \overline{\Omega}_m(b_m + 1)$ c are the coefficients. Usually, c is equal to the node value of $X_k$ determined during calibration for the corresponding $\overline{\Omega}(i)$ node values. Sometimes (such as for cubic B-splines), c may be a pre-filtered version of the node values.

O is the interpolation kernel half-size u is the interpolation kernel.

For linear interpolation, one may choose

O=1, and $$u_0(x)=1-x \text{ and } u_1(x)=x$$

For cubic interpolation using Hermite polynomials, specifically for the case of a Catmull-Rom spline, one may choose $$O = 2, \text{ and}$$
$$u_{-1}(x) = \frac{-t^3 + 2t^2 - t}{2}, u_0(x) = \frac{3t^3 - 5t^2 + 2}{2},$$
$$u_1(x) = \frac{-3t^3 + 4t^2 + t}{2}, \text{ and } u_2(x) = \frac{3t^3 - 2t^2}{2}$$

Note that, conveniently, the derivatives of the interpolation kernel can be found by $$f'_{k,(m)}(\Omega) = \sum_{i_1=-(O-1)}^{O} \sum_{i_2=-(O-1)}^{O} \cdots$$
$$\sum_{i_M=-(O-1)}^{O} c_{b_1+i_1,b_2+i_2,\ldots,b_M+i_M} u_{i_1}\left(\frac{\Omega_1 - \overline{\Omega}_1(b_1)}{\overline{\Omega}_1(b_1+1) - \overline{\Omega}_1(b_1)}\right) \cdots$$
$$u'_{i_m}\left(\frac{\Omega_2 - \overline{\Omega}_2(b_2)}{\overline{\Omega}_2(b_2+1) - \overline{\Omega}_2(b_2)}\right) \cdots u_{i_M}\left(\frac{\Omega_M - \overline{\Omega}_M(b_M)}{\overline{\Omega}_M(b_M+1) - \overline{\Omega}_M(b_M)}\right)$$

and $$f''_{k,(m)}(\Omega) = \sum_{i_1=-(O-1)}^{O} \sum_{i_2=-(O-1)}^{O} \cdots$$
$$\sum_{i_M=-(O-1)}^{O} c_{b_1+i_1,b_2+i_2,\ldots,b_M+i_M} u_{i_1}\left(\frac{\Omega_1 - \overline{\Omega}_1(b_1)}{\overline{\Omega}_1(b_1+1) - \overline{\Omega}_1(b_1)}\right) \cdots$$
$$u''_{i_m}\left(\frac{\Omega_2 - \overline{\Omega}_2(b_2)}{\overline{\Omega}_2(b_2+1) - \overline{\Omega}_2(b_2)}\right) \cdots u_{i_M}\left(\frac{\Omega_M - \overline{\Omega}_M(b_M)}{\overline{\Omega}_M(b_M+1) - \overline{\Omega}_M(b_M)}\right)$$

Thus, if necessary, the derivatives of the table interpolation can be found by repeating the interpolation process with slightly modified interpolation kernels, where the new kernels $u'_m(x)$ or $u''_m(x)$ can easily be found analytically from the original interpolation kernel.

In addition to the choices shown above, there are many other interpolation choices known in the art, including some that fall under the above general form, and some that do not. This general approach of taking analytic derivatives of the interpolation kernels to facilitate supplying derivatives to efficient search algorithms can be extended to a wide variety of interpolation methods beyond those mentioned here.

In addition, several modifications can further improve the efficiency of the table-interpolation approach. For example, one might choose during calibration to force the node values $\overline{\Omega}_m(i)$ to be equally spaced. Let $\Delta\Omega_m$ be this node spacing. This allows the bins to be efficiently found by $$b_m = \text{floor}\left(\frac{\Omega_m - \overline{\Omega}_m(0)}{\Delta\Omega_m}\right)$$

and simplifies the interpolation to $$f_k(\Omega) =$$
$$\sum_{i_1=-(O-1)}^{O} \sum_{i_2=-(O-1)}^{O} \cdots \sum_{i_M=-(O-1)}^{O} c_{b_1+i_1,b_2+i_2,\ldots,b_M+i_M} u_{i_1}\left(\frac{\Omega_1 - \overline{\Omega}_1(b_1)}{\Delta\overline{\Omega}_1}\right)$$
$$u_{i_2}\left(\frac{\Omega_2 - \overline{\Omega}_2(b_2)}{\Delta\overline{\Omega}_2}\right) \cdots u_{i_3}\left(\frac{\Omega_M - \overline{\Omega}_M(b_M)}{\Delta\overline{\Omega}_3}\right)$$

In general, table interpolation in one of the above forms (whether or not using equally spaced nodes) requires $(2O)^M$ memory fetches to retrieve the values for c. For example, for interpolation of a table with two material descriptors (say, one for common mode value and one for material number), linear interpolation requires 4 memory fetches, and cubic interpolation requires 16 memory fetches. For three-dimensional interpolation (i.e. for a table with three material descriptors), linear interpolation requires 8 fetches and cubic interpolation requires 64 memory fetches. Alternatively, one can take advantage of hardware interpolation, or texture fetching, commonly available on graphics accelerator hardware. For example, many cards can perform two-dimensional linear interpolation directly in hardware, saving computations, and requiring only one memory fetch instead of four. More recent cards from nVidia also support three-dimensional linear interpolation in hardware, requiring only one memory fetch instead of eight. Since processing speed can often be limited by memory bandwidth instead of computations, decreasing the number of memory accesses can provide a substantial savings in execution time. It is anticipated that in the future, some cards may also support higher-order interpolation directly in hardware.

Nonetheless, there are also methods, known in the art, of exploiting lower-order hardware interpolation to accelerate higher-order interpolation. For example, the method of Sigg and Hadwiger can be used to perform cubic interpolation with only $(O)^M$ memory fetches, reducing the fetches from 16 to 4 for two-dimensional cubic interpolation, or from 64 to 8 for three-dimensional cubic interpolation. Such methods have the advantage of saving computations and memory fetches and therefore greatly improving speed. However, they have the disadvantage that hardware interpolation is often at a lower resolution than normal floating point computations. Furthermore, the direct approach requires the same number of memory accesses whether or not the 1st and 2nd derivatives are computed, but these optimized approaches tend to sometimes need additional memory accesses to compute the derivatives. For these reasons, hardware accelerated interpolation can provide substantial speed savings when appropriate, but may not be the best solution for all settings, depending on a number of factors such as search algorithm, target application, and choice of computing hardware.

Once the derivatives $$\frac{d}{d\Omega_{i,j,m}} C(\Omega)$$

and optionally $$\frac{d^2}{d\Omega_{i,j,m}^2} C(\Omega)$$

can be calculated, to minimize C one can invoke any number of off-the-shelf search algorithms as known in the art. These include gradient descent, Newton-Raphson, nonlinear conjugate gradients, Gauss-Siedel iterations, and quasi-Newton methods (including the Davidson-Fletcher-Powell approach, the Broyden-Fletcher-Goldfarb-Shanno approach, the limited-memory Broyden-Fletcher-Goldfarb-Shanno approach). Even within a given approach, there are a number of variations. For example, the conjugate gradient approach can be performed with Fletcher-Reeves updates or with Polak-Ribiere updates; its search direction can be preconditioned using an exact Hessian, an approximate Hessian (or list of second derivatives), or the preconditioning can be skipped altogether; and its line-search step (to perform a one-dimensional search) can be implemented using gradient descent, the Newton-Raphson method, the Secant method, the golden section search, or any number of other methods suitable for one-dimensional searching. As such, it is not feasible to list all of the appropriate search algorithms in this text. Furthermore, since the various methods and their variations vary in their computational complexity, implementation complexity, initialization dependence, noise robustness, floating point precision requirements, convergence speed, region of convergence, memory requirements, and other properties, it is unlikely that any one such algorithm will be the best for all choices of mismatch function, roughness function, model function, model function implementation method, etc. However, using the teachings presented here, one can obtain canned search algorithms, or modify their own search algorithms, to produce the material descriptors by supplying the functions C, $$\frac{d}{d\Omega_{i,j,m}} C(\Omega),$$

and/or $$\frac{d^2}{d\Omega_{i,j,m}^2} C(\Omega)$$

to the search algorithms. Some such canned algorithms, for example, are readily available in a report by J. Shewchuk.

Once $\Omega$ has been calculated, it is generally desirable to also estimate a confidence level for each value in $\Omega$. For the sake of an illustrative example, consider the Z component of $\Omega$. By one approach, even if one finds Z (through $\Omega$) via iterative searching of a regularized cost function, one can still estimate $\sigma_Z$ using the same method described above for the non-iterative approach of calculating Z. One can then use these calculated $\sigma_Z$ values as direct estimates of the noise in Z, or one can first adjust these $\sigma_Z$ values to account for the effect of regularization. For example, one can process $\sigma_Z$ in a similar fashion to what would be done for an explicit edge-preserving smoothing filter, where the edge locations are determined by noting the break-points in the weak membrane, and the degree of smoothing is analogous to the $\lambda$ parameter. For example, $$\sigma_{Z_{i,j}^{out}} = \sqrt{\sum_{(m,n) \in B_{i,j}} h_{m,n}^2 \sigma_{Z_{i+m,j+n}^{in}}^2}$$

where $B_{ij}$ represents the set of all pixels that are both within $\lambda$ (or a multiple of $\lambda$, or a function of $\lambda$) of pixel (i,j) and not separated by a break-point in the weak membrane, and h is a smoothing kernel that falls off over a spatial scale calculated from $\lambda$ (such as proportional to $\lambda$).

By another approach, one can directly estimate a confidence-level from the result of the searching operation. In general, a well-defined minimum in the cost function means that Z is unambiguous and $\sigma_Z$ is small, whereas a poorly defined minimum in the cost function corresponds to less certainty about Z and therefore a larger $\sigma_Z$. One way to measure the quality of a minimum is to measure its curvature, which largely depends on the second derivative. For example, one might choose $$(\text{confidence level})_{i,j} = \text{func}\left(\sum_k \frac{d^2}{d\Omega_{i,j,k}^2} C(\Omega)\right)$$

for some function that maps low 2nd derivative to low confidence and high 2nd derivative to high confidence. Alternatively, one might choose to separately address the mismatch and roughness terms. For example, one can estimate the curvature of only the mismatch component of C. One way to do this is to calculate what change in Z is necessary to effect a certain amount of change in D. A useful choice is the "$3\sigma$" rule, where $\sigma_Z$ describes the change in Z necessary to change that pixel's mismatch contribution by three standard deviations. Say that one first measures $\sigma_k^{air}$, the SNR through air for detected spectrum k. Then the standard deviation of datum $X_k$ is approximately $$\sigma_{X_k} \approx \sigma_k^{air} \sqrt{X_k}.$$

Then for weighted squared-error, the standard-deviation of that pixel's contribution to mismatch is $$\sigma_D = \sqrt{\sum_k w_k \sigma_{X_k}^2},$$

and thus $\sigma_Z$ can be calculated as $$\sigma_Z \approx \sqrt{\frac{2\delta \sigma_D D(\Omega)}{\frac{d^2}{dZ^2} D(\Omega)}}$$

where $$\frac{d^2}{dZ^2} D(\Omega)$$

can be calculated using methods described earlier, and δ is the desired number of standard deviations (δ=3 for the "3σ" rule).

When $\sigma_Z$ is calculated to judge the quality of the minimum of the mismatch function, one can then adjust $\sigma_Z$ to account for the effect of regularizing with roughness terms. For example, one can process $\sigma_Z$ by treating the regularization as an edge-preserving smoothing operation with scale λ and edges corresponding to weak-membrane break points, using methods described earlier.

It should be noted that several of these methods can be combined. For example, the overall confidence in Z could involve both an explicit model for $\sigma_Z$ as well as a term quantifying the curvature of cost around the search result. Those skilled in the art will appreciate that these teachings will readily accommodate other approaches and options for calculating noise.

Sometimes, rather than predicting X from only material descriptors, it may be desirable to predict some components of X from the material descriptor(s) and from other components of X. For an illustrative example, consider two measured images:

$L_{i,j}$ low-energy readings $H_{i,j}$ high-energy readings and a single material descriptor (material number), where we want to find $Y_{i,j}$ material number estimate Mismatch Function By one approach (similar to the non-regularized calibration approach given earlier), the misfit function is found by warping the (H,L) data to obtain two new variables A and B, then measuring the difference of one predicted from the other. An example list of some suitable warpings was given earlier. For example, one could choose $$A(H, L) = -\log(H)$$

and $$B(H, L) = -\log(L)$$

or $$A(H, L) = (-\log(H) - \log(L))/2$$

and $$B(H, L) = -\log L - \sum_{k=0}^{PolyOrder} a_k (-\log H)^k$$

where $a_k$ values are obtained through least squares fitting.

It may be desirable, though it is not required, that these warpings are the same as those used in the non-regularized calibration. Optionally, a location warping function C may also be used.

One can then define some predictor function $f(A,Y,C)$ designed to predict the value of B from a measured value of A and an estimated value of Y, at a location C.

This predictor function can be designed in essence the same way as in the non-regularized calibration method given earlier. For example, one can assume that $$f(A, Y, C) = \sum_{i=0}^{M_a} \sum_{j=0}^{M_y} \sum_{k=0}^{M_c} c_{i,j,k} \phi_i^a(A) \phi_j^y(Y) \phi_k^c(C).$$

Then, for a set of measured or simulated points $H_n, L_n, C_n, \bar{Y}_n$, calculate $A_n, B_n$ and search for the coefficients that minimize $$\sum_{n=1}^{N} w_n (B_n - f(A_n, \bar{Y}_n, C_n))^p$$

where the preferred exponent is p=2, and the available options for bases φ, weightings w, and so forth, are the same as described earlier, and points may be pre-filtered, also as described earlier. Note, however, that if this regularization approach is used in tandem with the non-regularized approach, two different sets of fitting coefficients can result, one for each approach. Additionally, the user may make different choices for the point filtering, bases, fitting orders, density weightings, noise weightings, and so forth for the two different approaches.

The predictor $f$ may also include a hull description, as described earlier. The predictor can extrapolate outside the hull, for example by, when asked to evaluate a point outside the hull, evaluating a low-order Taylor series approximation of $f$ about the nearest point on the hull.

Given a choice of warping functions and a predictor, the mismatch function can then be calculated as the difference between the measured and predicted values:

$$D(X, Y) = \sum_{i,j} |B(H_{i,j}, L_{i,j}) - f(A(H_{i,j}, L_{i,j}), Y_{i,j}, C_{i,j})|^p$$

or as one of the other variations of mismatch given earlier.

Roughness Function

The options for roughness function are the same as was given earlier.

Search Algorithm

An initial estimate of $Y_{i,j}$ can be, for example, all zeros, all ones, random values, or the image $\tilde{Y}$ produced by the non-regularized predictor described earlier. This last choice, $\tilde{Y}$, can result in fast convergence, but requires extra computations to compute the initialization and extra calibration effort to produce two different predictors (Y can be thought of as a forward predictor, and $f$ as a reverse predictor), however the improvement in search speed is usually well worth the effort.

One can calculate $A_{i,j}$ first warping $B_{i,j}$ second warping

The regularized cost function is $$F = D + \sum_i \sum_j \left[ g\left(\frac{d}{dx}Z_{i,j}\right) + g\left(\frac{d}{dy}Z_{i,j}\right) \right]$$

which, for the raised error roughness function described above, is $$F = \sum_i \sum_j |B_{i,j} - f(A_{i,j}, Y_{i,j}, C_{i,j})|^p + \sum_i \sum_j \left[ g\left(\frac{d}{dx}Y_{i,j}\right) + g\left(\frac{d}{dy}Y_{i,j}\right) \right].$$

And one can once again perform any gradient-based search algorithm, this time using $$\frac{dF}{dY_{i,j}} = p \times |B_{i,j} - f(A_{i,j}, Y_{i,j}, C_{i,j})|^{p-1} \times$$

$$\text{sign}(f(A_{i,j}, Y_{i,j}, C_{i,j})) \times f'(A_{i,j}, Y_{i,j}, C_{i,j}) + g'(Y_{i,j}^x) * \tilde{h} + g'(Y_{i,j}^y) * \tilde{h}^t$$

(note that if p is a positive even integer, then the absolute value symbol and the sign( . . . ) function may be removed, which can improve speed)

where $$f'(A, Y, C) = \frac{d}{dY} f(A, Y, C)$$

which, for the preferred predictor given above, is $$f'(A, Y, C) = \sum_{i=0}^{M_a} \sum_{j=0}^{M_y} \sum_{k=0}^{M_c} c_{i,j,k} \left(\frac{d}{dA}\phi_i^a(A)\right)\left(\frac{d}{dY}\phi_j^y(Y)\right)\left(\frac{d}{dC}\phi_k^c(C)\right).$$

Note that the derivative of each basis function may be easily derived from the basis' analytical formula. A similar expansion can be straightforwardly derived for points extrapolated outside the hull with Taylor series by taking the derivative of the Taylor series extrapolation function. Similar expansions can also be found, as was described earlier, for other modeling types, such as table-interpolation, or non-separable bases.

As before, a number of off the shelf gradient-based search algorithms can now be employed. A corresponding algorithm based on gradient descent with adaptive step sizes can be set forth as follows:

```
User inputs:
    α, λ
    Input images,
    H, L
Algorithm inputs:        (suggested)
    MaxIters              300
    MaxLineSearchIters    50
    h                     [0, 1, −1]
    f_ω^growth            1.2
    f_ω^shrink            0.3
    ε                     0.001 (depends on data range)
    A, B, C warping functions and f predictor function
    ErrorPower (i.e. k)   2
Initialization:
```

Y = $\tilde{Y}$ from non-regularized predictor (which can also be reasonably be viewed as a forward predictor), or some other suitable initialization
Repeat     // loop through all p values
Perform convolutions:
Y$^x$ = Y * h
Y$^y$ = Y * h$^t$
    Calculate initial cost:

$$F = \sum_i \sum_j |B_{i,j} - f(A_{i,j}, Y_{i,j}, C_{i,j})|^p + \sum_i \sum_j [g(Z_{i,j}^x) + g(Z_{i,j}^y)]$$

Set iter = 1
Set ω = large number
Set finished = false
Repeat:        //repeat until the image has converged
    Set F$_{old}$ = F
    Calculate step direction image $$\frac{dF}{dY_{i,j}} = p \times |B_{i,j} - f(A_{i,j}, Y_{i,j}, C_{i,j})|^{p-1} \times$$

$$\text{sign}(f(A_{i,j}, Y_{i,j}, C_{i,j})) \times f'(A_{i,j}, Y_{i,j}, C_{i,j}) + g'(Y_{i,j}^x) * \tilde{h} + g'(Y_{i,j}^y) * \tilde{h}^t$$

Set LineSearchIters = 0
    Repeat:        // adjust step size until improvement is monotonic
        Calculate candidate image -continued $$Y_{i,j}^{test} = Y_{i,j} - \omega \times \frac{dF}{dY_{i,j}} \qquad \text{for all } i, j$$

Perform convolutions:
   $Y^x = Y^{test} * h$
   $Y^y = Y^{test} * h^t$
Measure F:

$$F_{test} = \sum_i \sum_j |B_{i,j} - f(A_{i,j}, Y_{i,j}^{test}, C_{i,j})|^p + \sum_i \sum_j [g(Y_{i,j}^x) + g(Y_{i,j}^y)]$$

```
    Set LineSearchIters = LineSearchIters + 1
    If(F_test ≥ F_old) then
        Set ω = f_ω^shrink × ω      // old step size was too big, let's shrink
    EndIf
Until (F_test < F_old) or (LineSearchIters ≥ MaxLineSearchIters) // done ω search
Set ω = f_ω^grow × ω       // let's try increasing the step size a little
If F_test < F_old then
    Set F = F_old
```

$$\text{Set MaxChange} = \max_{i,j} |Y_{i,j} - Y_{i,j}^{test}|$$

```
    If (MaxChange ≤ ε) then set finished = true
        Set Z_{i,j} = Z_{i,j}^{test}     for all i, j
    Else
        Set finished = true
    EndIf
    Set iter = iter + 1
    If iter ≥ MaxIters then
        set finished = true
    EndIf
Until finished   // done converging
```

As before, one can also extend the above algorithm to include graduated non-convexity for non-convex cost functions, but for computational reasons, it is generally more desirable to just use convex roughness functions and a simpler searching algorithm.

Pseudocolor

These teachings will also accommodate the use of pseudocolor for material discrimination. This can comprise, for example, combining the attenuation image and the Z-image into a single viewable image. By one approach this can comprise having the lightness/darkness of the image correspond to the attenuation image, and the color of the image correspond to the Z-image. There are many different useful color spaces for describing color. Below are some suggested methods for combining attenuation and Z in different color spaces. Let P denote the common-mode value, or something similar to it. For example, when the common-mode value is not explicitly measured, one can use the image from a single detected spectrum (such as $P_{hi}$) for C, or alternatively one can use the average of all detected-spectrum images.

RGB-based Pseudocolor with Overlays

On most computer displays, a color image to be displayed generally must ultimately be represented by separate values for red, green, and blue (RGB). It may often be useful to inspect a P image, Z image, or other higher order component of Ω, by looking at that image in grayscale. This can be performed by setting the R,G, and B values to all be equal to the values of the image of interest (normalized to a suitable range). Alternatively, it may be useful to see information from more than one of those images at the same time. One way to do this is to display the images side-by-side. Another particularly useful approach is to display the images in pseudocolor, where the RGB values are calculated from more than one image. For example, this can be accomplished by RGB overlays, where one first makes a base purely grey-level image (where R=G=B) from the attenuation image, then adds a colorized version of Z on top of it.

$$\begin{bmatrix} R \\ G \\ B \end{bmatrix}_{display} = w_{atten} \times \begin{bmatrix} 1 \\ 1 \\ 1 \end{bmatrix} \times P + w_z \times colormap(Z)$$

The Z values can be mapped to different RGB values.

Hue-based Pseudocolor

Another approach for pseudocolor is Hue-based pseudocolor. In HSV (hue, saturation, value) space,
   H describes the hue of a pixel (ranging from 0-1)
   S describes the saturation of a pixel (0=grey, 1=fully saturated color)
   V describes how bright a pixel is (0=black, 1=bright)
   Thus a natural colorization is
   H is some function of Z (H=Z, H=sqrt(Z), etc)
   and V is some function of P (V=P, V=sqrt(P)/2+0.5 V=log (P), etc)
   and S can be chosen to be related to confidence, so that full confidence (or small standard deviation) maps to full color, and no confidence (high standard deviation) maps to grayscale. Similarly, one can choose S to be fully saturated when P is close to the air value, and/or when P represents an excessively long path length. One can of course combine these and other criteria.

Alternatively, one may perform colorizing by table lookup, based on a configurable mapping. For example, one might specify a list of (P,Z,$\sigma_Z$,H,S,V) control points and interpolate from a given (P,Z,$\sigma_Z$) triplet to determine the (H,S,V) coloring. (These P values might be exactly the P value described earlier, or it might be some modification of the P value, for example after histogram equalization, grayscale windowing, edge enhancement, image smoothing, or other image processing steps known in the art). Similarly, one might specify a list of (P,Z,H,S,V) control points, and separately configure how color should be adjusted for large $\sigma_Z$. Furthermore, one might specify special coloring modes for any or all of the following events:

penetration failure due to excessively short path length
    penetration failure due to excessively long path length
    unresolvable ambiguity at normal path length
    ambiguity at normal path length that could be resolved by additional measurement(s)

To generate the control points, one might use a smooth blending approach, where the (H,S,V) values vary continuously, or one might use a hard approach, where the (H,S,V) values may change abruptly. The former (continuous) is useful in that if some of the materials in the image are right on the borderline between control points, a smooth and repeatable color is still displayed. The latter (discrete) is useful for visually consolidating different ranges of continuous values into distinct classes. (It may be noted that other approaches are suitable in these same regards. For example, there are known clustering/segmentation algorithms that can achieve a similar result albeit via a different approach. Such approaches, known in the art, could also be used to enhance the approach given here. For example, these teachings will accommodate supplementing these approaches with a follow-on segmentation algorithm.)

Furthermore, one might choose to have several such configurable colormaps. For example, one might have a certain colormap that is used for general inspection, and optimized colormaps that show details for certain ranges of materials by using more colors on those ranges at the expense of using fewer colors (or no colors) for other materials. For example, a general inspection colormap might assign different colors to all possible values of Z. An organic-optimized colormap, on the other hand, might assign different hue values to the range Z=2 to Z=16, and leave any higher Z values in grayscale (or even as pure white). Similar optimized colormaps could be developed and used for other classes of materials.

Conceivably, one could have separate colormaps for general organic, general inorganic, general hi-Z, produce, machine parts, appliances, beverages, nuclear materials, cleaning supplies, lumber, grains, minerals, car batteries, or any other class of materials. By one approach, the image can be initially displayed to the user using a default colormap (such as the general inspection colormap), then the user can switch to another colormap after surveying the image contents. By another approach, a suitable colormap can be automatically chosen based on the contents of the images. By another approach, the user might choose the initial colormap based on a manifest declaration or other a-priori knowledge of the image's expected contents.

These colormaps can be arranged as presets that are made available via a corresponding user interface, so a user may conveniently and quickly cycle between different colormaps. Alternatively, the colormaps can be user-editable, so a user can manipulate individual control points to finely adjust the colorization. These approaches may of course be combined. Furthermore, one might extend the concept of presets to include not only colormap, but a preset combination of colormap, material descriptor generation algorithm, choice of smoothing method(s), choice of enhancement method(s), choice of analysis method(s), other display settings, and/or list of associated parameters.

Analysis

In many cases, it may be useful to extract higher-level information from the material descriptors. This information may be displayed in image form (for example by modifying the pseudocoloring approach or by flashing pixels of interest), in other graphical form (such as with indicator levels), in numerical form (such as by displaying an information box, or by generating a summary report), in audible form (such as by sounding an alarm), or any other number of methods. For example, it may be useful to segment the image data into separate objects and perform some automated analysis of each object. This could be done through standard segmentation methods as known in the art, or by looking for membrane breakpoints (when using a weak membrane approach), or by some combination of these. It may often be desirable to calculate an area of each such object (perhaps in pixels$^2$, mm$^2$, cm$^2$, or in$^2$). It may also be desirable to estimate density $\rho$ (usually in g/cm$^3$). For example, one can a-priori build a lookup table (either through theory or calibration) so that once Z is calculated, a corresponding rough estimated value of density $\rho$ can be calculated from Z, or from both P and Z, or also including information from higher order descriptors. Similarly, one can calculate an estimated path length for each pixel, for example by calculating $$t \approx \frac{-\log P}{\mu \rho},$$

where $\rho$ can be estimated as described above, and one can obtain a rough estimate of $\mu$ once for a given scanner, or for perhaps more accurate results, one can estimate $\mu$ as a function of P and Z. One may also combine such measurements. For example, one can calculate an approximate volume of an object by multiplying area by average path length, or more accurately by summing all the estimated path lengths present in the object. One can furthermore discern objects by using shape information using computer vision approaches known in the art. Numerous other analysis techniques are further available in this regard.

Those skilled in the art will recognize and appreciate that these teachings readily leverage existing dual-energy penetrating imaging systems in favor of materials discrimination in a cost effective, timely manner. The resultant identification information can be used immediately, if desired, to facilitate an automated alert system or the like. These teachings are particularly adept at accommodating noisy circumstances and images which are unfortunately more typical than not in many application settings. These teachings are also tolerant of being applied in an application setting where the process can begin even prior to having collected the image of the complete object. This, in turn, provides further time savings and efficiency.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
    by a processor:
        retrieving from memory at least first image data and second image data, wherein the first image data comprises a penetrating image of at least part of at least one object formed using a first detected spectrum and the second image data comprises a penetrating image of at least a part of the object formed using a second detected spectrum that is different than the first spectrum;

fusing the at least first and second image data to identify at least one material descriptor from a continuous scale of material descriptors that at least a part of the object comprises.

2. The method of claim 1 wherein the first detected spectrum comprises a source spectrum of x-ray energies with a high typical energy, and the second detected spectrum comprises a source spectrum of x-ray energies with a relatively lower typical energy.

3. The method of claim 1 wherein using a first detected spectrum comprises forming the penetrating image as comprises the first image data using a detector with a first spectral response, and using a second detected spectrum comprises forming the penetrating image as comprises the second image data using a detector with a second spectral response that is different from the first spectral response.

4. The method of claim 1 wherein the at least first image data and second image data are spatially registered.

5. The method of claim 1 wherein fusing the at least first and second image data comprises, at least in part, fusing image data as a function of mismatch.

6. The method of claim 5 wherein the mismatch is determined to be least when the pixel values as correspond to the image data are consistent with at least one of:
corresponding material descriptors as correlate to each of the pixel values; and
common-mode descriptors as correlate to each of the pixel values.

7. The method of claim 6 wherein the mismatch is determined to be least when the pixel values as correspond to the image data are consistent with both of:
corresponding material descriptors as correlate to each of the pixel values; and
common-mode descriptors as correlate to each of the pixel values.

8. The method of claim 6 wherein fusing the at least first and second image data comprises, at least in part, regularizing image data as a function of roughness.

9. The method of claim 8 wherein the roughness is determined to be less as at least one of the material descriptors and the common-mode descriptors form regions that are more smooth.

10. The method of claim 8 wherein a measurement of the roughness is influenced by a parameter describing a spatial scale over which smoothness is judged.

11. The method of claim 10 wherein the measurement of the roughness does not significantly penalize abrupt changes in a corresponding material descriptor occurring at a boundary between regions of different materials, and wherein the measurement of the roughness may also be influenced by a parameter describing a desired edge threshold.

12. The method of claim 10 wherein the measurement of the roughness does not significantly penalize smooth changes in a corresponding common-mode descriptor or isolated abrupt changes in a common-mode descriptor occurring at edges in the object and wherein the measurement of the roughness may also be influenced by a parameter describing a desired edge threshold.

13. The method of claim 1 wherein fusing the at least first and second image data comprises, at least in part:
fusing image data as a function of a mismatch; and
regularizing the image data as a function of roughness;
and identifying a particular material identifier image that minimizes a compromise between the mismatch and the roughness.

14. The method of claim 13 wherein fusing the at least first and second image data comprises, in addition to identifying a particular material identifier image, identifying at least one confidence metric.

15. The method of claim 1 wherein fusing the at least first and second image data to identify a material as comprises at least a part of the object comprises, at least in part, describing the material as a function of effective atomic numbers.

16. The method of claim 1 wherein fusing the at least first and second image data comprises, at least in part, fusing image data by use of at least one model function.

17. The method of claim 16 wherein at least one model function calculates a value of the material descriptions from the at least two sets of image data, and the mismatch of a certain estimate for the material descriptors is at least in part a function of a difference between at least one prediction as corresponds to the at least one model function and the material descriptors estimate.

18. The method of claim 17 wherein the at least one model function calculates a list of possible values for the material descriptors from the at least two sets of image data, and the mismatch of a certain estimate for the material descriptors is a function of a difference between a model function-based prediction and the material descriptors estimate.

19. The method of claim 16 wherein the at least one model function calculates at least one confidence metric for the material descriptions.

20. The method of claim 19 wherein the at least one model function has parameters that are determined via calibration.

21. The method of claim 19 wherein the at least one model function is derived analytically from the model function for material descriptors.

22. The method of claim 16 wherein at least one model function calculates a predicted image for at least one set of image data as a function of at least one of a common mode image and at least one other set of image data and from a guess for the material descriptions, and a mismatch for a certain guess for the material descriptors is at least in part a function of a difference between measured values and the predicted image.

23. The method of claim 16 wherein at least one model function is also a function of at least one of a detector channel number, and a position of at least one of a penetrating energy source, penetrating energy detector, and scan object.

24. The method of claim 16 wherein at least one model function is also a function of at least one value produced by a beam quality detector.

25. The method of claim 16 wherein the model function is a parametric function of at least two inputs and that also uses at least one predictor coefficient and produces at least one output.

26. The method of claim 25 wherein the parametric function includes a polynomial.

27. The method of claim 25 wherein the predictor coefficients are determined via calibration.

28. The method of claim 27 further comprising:
determining the coefficients using at least one of an empirical approach and a mathematical approach of determining the coefficients.

29. The method of claim 28 wherein determining the coefficients using an empirical approach of determining the coefficients comprises using a calibration object that is comprised of a first stepped wedge formed of a first material and a second stepped wedge formed of a second material, wherein the first material is different from the second material, wherein the first stepped wedge is disposed substantially normal to the second stepped wedge, and wherein the first stepped wedge and the second stepped wedge are disposed such that at least some penetrating energy as is used to empirically gather information that is used to determine the coefficients must pass through both the first stepped wedge and the second stepped wedge.

30. The method of claim 29 where several calibration scans are performed with different combinations of calibration objects.

31. The method of claim 28 wherein determining the coefficients using an empirical approach comprises collecting a set of data points from different locations within the penetrating images, each comprising:
- a material descriptor, known or calculated from a calibration scene design;
- at least one measured typical pixel value in each penetrating image for the region corresponding to the material descriptor;
- and optionally at least one measured noise value in each penetrating image for the region corresponding to the material descriptor;
- and using these data points to determine the optimal predictor coefficients.

32. The method of claim 31 wherein each of the set of data points further comprises at least one measured beam quality value for each acquired view.

33. The method of claim 1 wherein fusing the image data may begin before the image data is finished being collected.

34. The method of claim 33 wherein fusing the image data is performed through updates that refine portions of at least one of a material description and a commonamode image that:
- correspond to those portions of the at least first and second image data that have been collected, and, if the updates are iterative, have not yet converged or are nearby to portions that have not yet converged.

35. The method of claim 1 wherein fusing the at least first and second image data comprises, at least in part, fusing image data by use of a ratio between corresponding data in two of the at least first and second image data.

36. The method of claim 1 wherein fusing the at least first and second image data comprises, at least in part, fusing image data by normalizing at least some of the data against a fit of values for a particular known material.

37. The method of claim 1 wherein fusing the first and second image data to identify at least one material as comprises at least a part of the object comprises:
- combining the first and second image data to provide combined image data;
- smoothing the combined image data.

38. The method of claim 37 wherein smoothing the combined image data comprises also adjusting confidence metrics to reflect an effect of the smoothing.

39. The method of claim 37 wherein combining the first and second image data to provide combined image data comprise producing multiple estimates for at least some of the combined image data and smoothing the data using a voting process.

40. The method of claim 37 wherein smoothing the combined image data comprises smoothing the combined image data in a manner that includes implicit edge preservation.

41. The method of claim 40 wherein smoothing the combined image data in a manner that includes implicit edge preservation comprises regularizing the combined image by simultaneously:
- fusing image data as a function of a mismatch; and
- also regularizing the image data as a function of roughness.

42. The method of claim 37 wherein smoothing the combined image data comprises smoothing the combined image data in a manner than includes explicit edge preservation.

43. The method of claim 42 wherein smoothing the combined image data in a manner that includes explicit edge preservation comprises using a barrier-impeded filtering approach.

44. The method of claim 37 wherein smoothing the combined image data comprises using the combined image data in a manner that includes both implicit edge preservation and explicit edge preservation.

45. An apparatus comprising:
- a memory having at least first image data and second image data stored therein, wherein the first image data comprises a penetrating image of at least part of an object formed using a first spectrum and the second image data comprises a penetrating image of at least a part of the object formed using a second spectrum that is different than the first spectrum;
- a processor operably coupled to the memory and being configured and arranged to substantially simultaneously regularize and fuse the at least first and second image data to identify at least one material descriptor from a continuous scale of material descriptors as comprises at least a part of the object.

46. The apparatus of claim 45 wherein the processor is further configured and arranged to substantially simultaneously regularize and fuse the at least first and second image data by, at least in part, fusing image data as a function of mismatch.

47. The apparatus of claim 46 wherein the processor is further configured and arranged to determine the mismatch to be least when the pixel values as correspond to the image data are consistent with at least one of:
- corresponding material descriptors; and
- corresponding common-mode descriptors;
- as correlate to each of the pixel values.

48. The apparatus of claim 45 wherein the processor is further configured and arranged to substantially simultaneously regularize and fuse the at least first and second image data by, at least in part, regularizing image data as a function of roughness.

49. The apparatus of claim 48 wherein the processor is further configured and arranged to determine a measurement of the roughness to be less as smoothness of at least one of material descriptors and common-mode descriptors as pertain to the image data increases.

50. The apparatus of claim 49 wherein the processor is further configured and arranged to substantially simultaneously regularize and fuse the at least first and second image data by, at least in part:
- fusing image data as a function of a mismatch; and
- also regularizing the image data as a function of roughness.

* * * * *